(12) United States Patent
Michaeli et al.

(10) Patent No.: US 10,686,482 B2
(45) Date of Patent: Jun. 16, 2020

(54) WI-GIG SIGNAL RADIATION VIA GROUND PLANE SUBWAVELENGTH SLIT

(71) Applicant: Intel Corporation, Santa Clara, CA (US)

(72) Inventors: Yaniv Michaeli, Holon (IL); Menashe Soffer, Herzelya (IL); Omer Asaf, Oranit (IL); Ana M. Yepes, Hillsboro, OR (US); Manish A. Hiranandani, Fremont, CA (US); Anand S. Konanur, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/386,753

(22) Filed: Dec. 21, 2016

(65) Prior Publication Data

US 2017/0250720 A1    Aug. 31, 2017

Related U.S. Application Data

(60) Provisional application No. 62/300,746, filed on Feb. 26, 2016.

(51) Int. Cl.
*H04B 1/3888* (2015.01)
*H04M 1/02* (2006.01)
(Continued)

(52) U.S. Cl.
CPC ........ *H04B 1/3888* (2013.01); *H01Q 1/243* (2013.01); *H01Q 1/42* (2013.01); *H01Q 13/10* (2013.01);
(Continued)

(58) Field of Classification Search
CPC combination set(s) only.
See application file for complete search history.

(56) References Cited

U.S. PATENT DOCUMENTS

| 2005/0031278 A1* | 2/2005 | Shi ............... G02B 6/262 385/121 |
| 2005/0052329 A1* | 3/2005 | Tsukamoto ....... H01Q 1/243 343/767 |

(Continued)

FOREIGN PATENT DOCUMENTS

| JP | 2003-124738 A | * | 4/2003 | .......... H01Q 13/10 |
| WO | WO-2014167812 A1 | | 10/2014 | |
| WO | WO-2017146916 A1 | | 8/2017 | |

OTHER PUBLICATIONS

"International Application Serial No. PCT/US2017/017397, International Search Report dated May 19, 2017", 3 pgs.

(Continued)

*Primary Examiner* — Zhitong Chen
(74) *Attorney, Agent, or Firm* — Schwegman, Lundberg & Woessner, P.A.

(57) ABSTRACT

A metal chassis for a mobile device is configured to transmit a signal of a wavelength. A first side of the chassis faces the inside of the mobile device and includes a first aperture that has a dimension that comprises a first subwavelength width of a slot in the chassis. A second side of the chassis faces free space and includes a second aperture that has a dimension that comprises a second subwavelength width of the slot in the chassis. A channel connects the first aperture and the second aperture. The slot has a length dimension and the channel may be centered along the length dimension. The channel is configured to support a transverse electromagnetic mode for propagation of the signal from the first aperture through the channel to the second aperture. As a part of a mobile device the chassis acts as a secondary radiator for the mobile device.

24 Claims, 18 Drawing Sheets

(51) Int. Cl.
- *H01Q 21/06* (2006.01)
- *H01Q 13/10* (2006.01)
- *H01Q 1/24* (2006.01)
- *H01Q 1/42* (2006.01)
- *H04W 88/02* (2009.01)
- *H04W 88/08* (2009.01)

(52) U.S. Cl.
CPC ........ *H01Q 21/065* (2013.01); *H04M 1/0202* (2013.01); *H04M 1/026* (2013.01); *H04W 88/02* (2013.01); *H04W 88/08* (2013.01)

(56) References Cited

U.S. PATENT DOCUMENTS

| | | |
|---|---|---|
| 2009/0066588 A1 | 3/2009 | Cheng et al. |
| 2011/0090128 A1 | 4/2011 | Sulima et al. |
| 2012/0206302 A1* | 8/2012 | Ramachandran ........ H01Q 1/24 343/702 |
| 2013/0082884 A1* | 4/2013 | Gummalla ............ G06F 1/1656 343/702 |
| 2014/0078008 A1* | 3/2014 | Kang ...................... H01Q 5/35 343/702 |
| 2015/0026754 A1 | 1/2015 | Girard |
| 2015/0029067 A1 | 1/2015 | Pang et al. |
| 2016/0072176 A1* | 3/2016 | Van Dijk ................ H01Q 1/44 343/721 |

OTHER PUBLICATIONS

"International Application Serial No. PCT/US2017/017397, Written Opinion dated May 19, 2017", 5 pgs.

Ebbesen, T.W., et al., "Extraordinary optical transmission through sub-wavelength hole arrays", Nature 391 | doi:10.1038/35570, (Feb. 12, 1998), 667-669.

Harrington, R., "Electromagnetic transmission through narrow slots in thick conducting screens", IEEE Transactions on Antennas and Propagation ( vol. 28, Issue: 5), (Sep. 1980), 616-622.

* cited by examiner

WI-GIG SIGNAL RADIATION VIA GROUND PLANE SUBWAVELENGTH SLIT

RELATED APPLICATIONS

This application claims the benefit of priority of U.S. Provisional Application Ser. No. 62/300,746, filed on Feb. 26, 2016, which is incorporated herein by reference in its entirety.

TECHNICAL FIELD

Some aspects of the present disclosure relate to millimeter-wave communication. Some devices relate to wireless devices. Some aspects of the present disclosure relate to the Institute of Electrical and Electronics Engineers (IEEE) 802.11 standard. Some aspects of the present disclosure relate to 5G. Some aspects of the present disclosure relate to a slit-in-chassis for a radio, the slit operating as a transmission line for millimeter wave signals, and the chassis operating as a secondary radiator when irradiated by a primary radiator, wherein the chassis is an integral part of the radio design.

BACKGROUND

Client PCs such as notebooks, 2-in-1, phablets, phones, and the like, are predominantly designed with metal chassis due to increased structural demands from thin chassis and improved aesthetics of all metal designs. This presents a significant challenge to antenna placement as radiators are enclosed in a Faraday Cage. One solution has been the use of slots to serve as antennas. A prime consideration here is to minimize the external profile presented by slot. There is a need to integrate high frequency Antennas, such as (60 GHz) WiGiG Antennas, in such platforms through the use of slots.

DETAILED DESCRIPTION

The following description and the drawings sufficiently illustrate specific aspects of the present disclosure to enable those skilled in the art to practice them. Other aspects of the present disclosure may incorporate structural, logical, electrical, process, and other changes. Portions and features of some aspects of the present disclosure may be included in, or substituted for, those of other aspects of the present disclosure. Aspects of the present disclosure set forth in the claims encompass all available equivalents of those claims.

Figure 1:
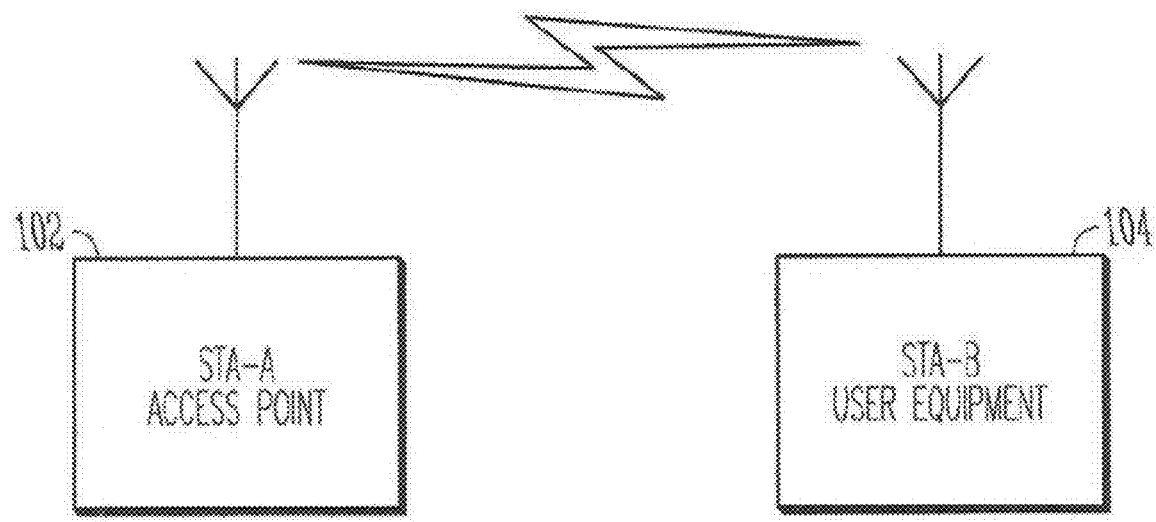
FIG. 1 illustrates various network elements of an exemplary wireless network in accordance with some aspects of the present disclosure.

FIG. 1 illustrates various network elements of a wireless network in accordance with some aspects of the present disclosure. Wireless network 100 includes a plurality of communication stations (STAs) and one or more access points (APs) which may communicate in accordance with IEEE 802.11 communication techniques. One or more communication station 104, illustrated as STA-B or User Equipment (UE) may be a mobile station (MS) device that is non-stationary and does not have fixed locations. One or more access point (AP) 102 may be stationary and have fixed locations. The AP 102 may be a communication station such as a base station (BS) that communicates with UE STA-B 104 using Full-Duplex Microchip Media Access Controller (FD-MiMAC) protocol. The Access Point Station A (AP STA-A) may announce its available remaining antenna capability as well as the channel information of a winning client in a contention for a transmission opportunity (TXOP). Both AP 102 and UE 104 may be configured for operation in millimeter-wave (mmWave) communication, particularly in mobile communication standards, such as 5G.

In some 5G aspects, a UE may communicate data (e.g., using a Physical Downlink Shared Channel (PDSCH) and/or a Physical Uplink Shared Channel (PUSCH) with a small cell or secondary cell while configured by a larger serving cell or primary cell and receiving control signals from the primary cell (with a Physical Downlink Control Channel (PDCCH)). In these aspects, communications with the smaller cell may take place using mmWave frequencies while communications with the larger cell may take place using microwave frequencies. In practice there may be several base stations (BS) and several UEs to allow for tracking and for such processes as hand-off, as needed.

Figure 2:
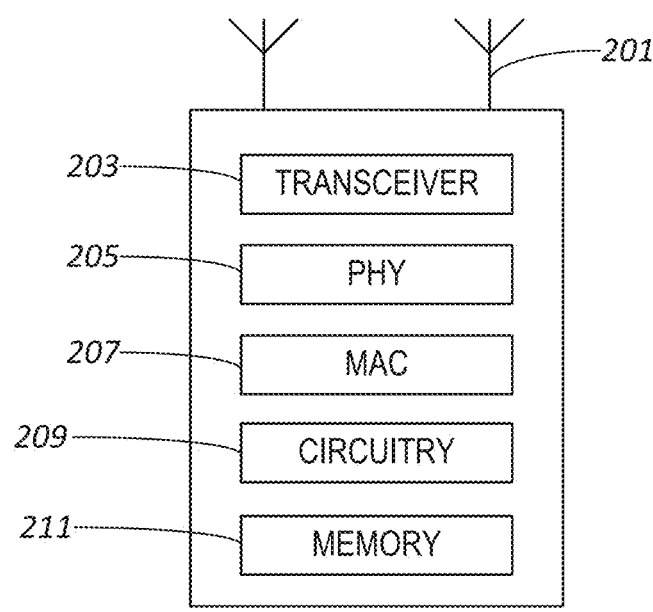
FIG. 2 illustrates an exemplary mobile station (MS) device in accordance with some aspects of the present disclosure.

FIG. 2 illustrates a Mobile Station (MS) device 200 in some aspects of the present disclosure. MS device 200 is a more detailed description of STA-B 104 of FIG. 1. MS device 200 may be a millimeter-wave (mmWave) compliant MS device that may be arranged to communicate with one or more other MS devices or one or more Base Station (BS). MS device 200 may be suitable for operating as User Equipment (UE). In some aspects of the present disclosure, MS device 200 may, include, among other things, a transmit/receive element 201 (for example an antenna), a transceiver 203, physical (PHY) circuitry 205, and media access control (MAC) circuitry 207. PHY circuitry 205 and MAC circuitry 207 may be mmWave compliant layers and may also be compliant with one or more other IEEE 802.11ax or IEEE 802.13 standards. MAC circuitry 207 may be arranged to configure packets such as a Physical Layer Convergence Procedure (PLCP) Protocol Data Unit (PPDU) and arranged to transmit and receive PPDUs, among other things. MS device 200 may also include circuitry 209 configured to perform the various operations described herein. The circuitry 209 may be coupled to the transceiver 203, which may be coupled to the transmit/receive element 201. While FIG. 2 depicts the circuitry 209 and the transceiver 203 as separate components, the circuitry 209 and the transceiver 203 may be integrated together in an electronic package or chip.

In some aspects of the present disclosure, the MAC circuitry 207 may be arranged to contend for a wireless medium during a contention period to receive control of the medium for an appropriate control period and configure a High Efficiency Wireless Local Area Network WLAN Physical Layer Convergence Protocol (PLCP) Protocol Data Unit (HEW PPDU). In sonic aspects of the present disclosure the PHY circuitry 205 may be arranged to transmit 5G mmWave packets. In sonic aspects of the present disclosure, the MAC circuitry 207 may be arranged to contend for the wireless medium based on channel contention settings, a transmitting power level, and a Clear Channel Assessment (CCA) level.

In some aspects of the present disclosure the PHY circuitry 205 may be arranged to transmit the HEW PPDU. The PHY circuitry 205 may include circuitry for modulation/demodulation, upconversion/downconversion, filtering, amplification, and the like. In some aspects of the present disclosure, the circuitry 209 may include one or more processors which may be configured for parallel processing. The circuitry 209 may be configured to perform functions based on instructions being stored in a RAM or ROM, or based on special purpose circuitry. The circuitry 209 may include processing circuitry and/or transceiver circuitry in some aspects of the present disclosure. The circuitry 209 may include a processor such as a general purpose processor or special purpose processor. The circuitry 209 may implement one or more functions associated with transmit/receive elements 201, the transceiver 203, the PHY circuitry 205, the MAC circuitry 207, and/or the memory 211.

In some aspects of the present disclosure, the circuitry 209 may be configured to perform one or more of the functions and/or methods described herein and/or in conjunction with FIGS. 3-10.

In some aspects of the present disclosure, the transmit/receive elements 201 may be two or more antennas that may be coupled to the PHY circuitry 204 and arranged for sending and receiving signals including transmission of the High Efficiency Wireless Local Area Network WLAN (HEW) packets. The transceiver 202 may transmit and receive data such as HEW PPDU and packets that include an indication that the MS device 200 should adapt the channel contention settings according to settings included in the packet. The memory 211 may store information for configuring the other circuitry to perform operations for configuring and transmitting HEW packets and performing the various operations to perform one or more of the functions and/or methods described herein and/or in conjunction with FIGS. 3-13.

In some aspects of the present disclosure, the MS device 200 may be configured to communicate using Orthogonal Frequency Division Multiplexing (OFDM) communication signals over a multi carrier communication channel. In some aspects of the present disclosure, MS device 200 may be configured to communicate in some one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 2, although the scope of the aspects of the present disclosure is not limited in this respect as they may also be suitable to transmit and/or receive communications in some other techniques and standards. In some aspects, the MS device 200 may use 4× symbol duration of 802.11n or 802.11ac.

In some aspects of the present disclosure, an MS device 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, and the like.), an access point, a base station, a transmit/receive device for a wireless standard such as 802.11 or 802.16, or other device that may receive and/or transmit information wirelessly. In some aspects of the present disclosure, the MS device may include one or more of a keyboard, a display, a non-volatile memory port, multiple antennas, a graphics processor, an application processor, speakers, and other mobile device elements. The display may be an LCD screen including a touch screen.

The transmit/receive element 201 may comprise one or more directional or omnidirectional antennas, including, for example, dipole antennas, monopole antennas, patch antennas, loop antennas, microstrip antennas or other types of antennas suitable for transmission of radio frequency (RF) signals. In some Multiple In Multiple Out (MIMO) aspects, the antennas may be effectively separated to take advantage of spatial diversity and the different channel characteristics that may result.

Although the MS device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (REICs) and combinations of various hardware and logic circuitry for performing at least the functions described herein. In some aspects of the present disclosure, the functional elements may refer to one or more processes operating on one or more processing elements.

Some aspects of the present disclosure may be implemented fully or partially in software and/or firmware. This software and/or firmware may take the form of instructions contained in or on a non-transitory computer-readable storage medium, or a machine-readable hardware storage device. Those instructions may then be read and executed by one or more processors to enable performance of the operations described herein. Those instructions may then be read and executed by one or more processors to cause the MS device 200 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, and the like.

In millimeter wave (mmWave) wireless communications, highly directional transmissions are essential for wireless communication. This is to compensate for high isotropic path loss. This requirement of directional beamforming complicates initial cell search, and beam selection. Here "beam selection" refers to a process in which the user equipment (UE) switches to a beam that is received with higher signal strength than the currently received beam, while remaining connected to a cell with, in some aspects of the present disclosure, multiple mmWave beams.

In this description, the words slit and slot may be used interchangeably to mean the same thing. Slots in metal chassis and large cutouts have traditionally been used to integrate low frequency antennas into a metal chassis. The present disclosure however, concerns itself with the use of slots (or "slits") for 60 GHz antennas. At these frequencies, a small 1.5 m slot (⅓ of a wavelength at 60 GHz) functions not just as an aperture for the 60 GHz radiation to make it out of the chassis but also serves as a secondary radiator. Because of the ability of the chassis to act as a secondary radiator, by suitable optimization of the cross section and dimensions of the slot, the chassis can me made an integral part of the radio design. This eases integration of Wireless Gigabit WiGiG Radio Front End Modules (RFEM) into client device designs, leading to a no-wires experience (and hence PC refresh) for a broader array of designs.

In addition, the cross section of the slot is optimized with a taper so that it presents a minimal 1.5 mm profile on the outer surface of the chassis, but a more substantial 3.7 mm profile on the inner surface of the chassis, according to some aspects of the present disclosure.

An important principle is the use of an optimized slit cross section, slit width and chassis thickness to setup a resonant transmission line mode in the slit. Such a transmission line mode allows for most of the radiation impinging on the side of the chassis to be transmitted to the outer edge, despite the dimensions being subwavelength.

Traditional slot antennas have apertures that are on the order of a wavelength in size (which would translate to ~5 mm at 60 GHz). Such a wide slot is visually conspicuous and also might compromise the structural integrity of the chassis, especially since is located close (a few mm) to the edge of the chassis.

An important innovation of the present chassis is the use of a subwavelength slit dimension (~30% of a wavelength at 60 GHz) to achieve comparable signal transmission to that afforded by the full size slit.

Figure 3A:
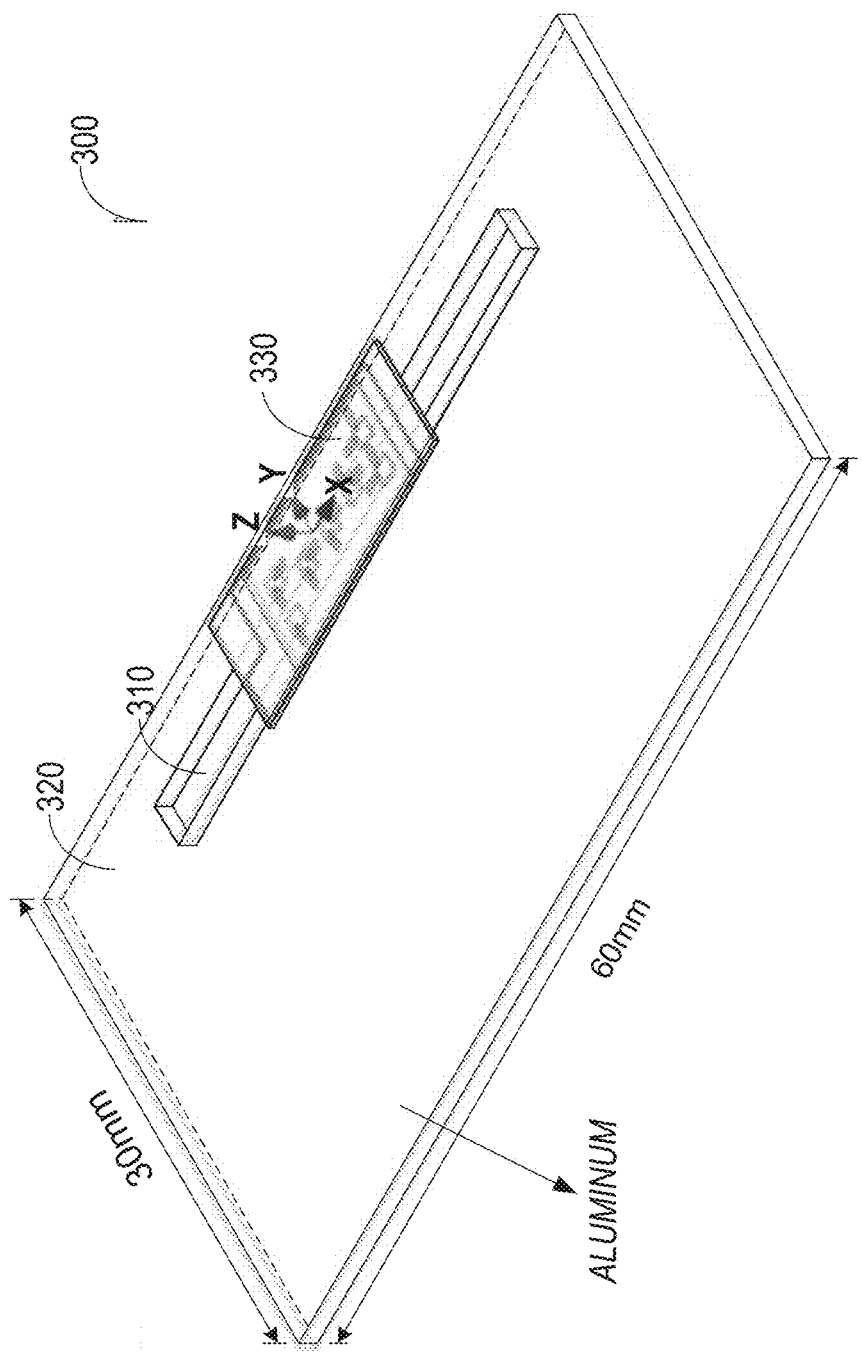
FIG. 3A illustrates exemplary three-dimensional view of a subwavelength slit in a client device chassis to enable 60 GHz signal transmission through the chassis, in accordance with some aspects of the present disclosure.

FIG. 3A illustrates a three-dimensional view 300 of a subwavelength slit 310 in a client device chassis 320 to enable 60 GHz signal transmission through the chassis, in accordance with some aspects of the present disclosure. The chassis may be aluminum that may be 1 mm thick. The slit may be filled with air as a dielectric. The REFM 330 and the slit 310 are centered in the X direction of the chassis where the coordinate system is illustrated in FIG. 3A. There may be a 0.3 millimeter gap between the patches (discussed in FIG. 3C) and the aluminum chassis. The slit length may be 40 mm with a width of 2.5 mm, all of the foregoing according to some aspects of the present disclosure. While 60 GHz has been used in this embodiment there is no theoretical limit to the frequency, low or high, in this innovation. However, in communication most often used frequencies are 10 GHz and above. The arrangement is illustrated as a rectangular slit in a chassis A and B covers. In other words, the slit is configured to support TEM modes. Consequently, there is a need for either a very wide parallel slit or two metal bodies, one inner conducting body and an outer conducting periphery. The coax is an example of the latter. An inner body is a cylinder and an outer body is a hollow cylinder. There is a source of waves such as RFEM 330 and a termination. This is discussed in additional detail below. Further, the thickness of the slit may be an odd multiple of the wavelengths to provide phase addition. The thickness should be such that there is phase addition between the induced fields on the first slit and the second slit.

The WiGiG RFEM 330 is placed against the slit 310, according to some aspects of the present disclosure. The slit is narrow enough that one would expect very limited transmission through the slit. However, by a judicious choice of chassis metal thickness, slit width and slit profile, as discussed above for some aspects of the present disclosure, transmission can be enhanced significantly. The RFEM 330 may be used to step up from intermediate frequencies (IF) to mm wave frequencies. Cables may still be used to keep baseband processing close to the central processing unit (CPU) of the client device, and to transmit baseband to the IF of the RFEM.

Figure 3B:
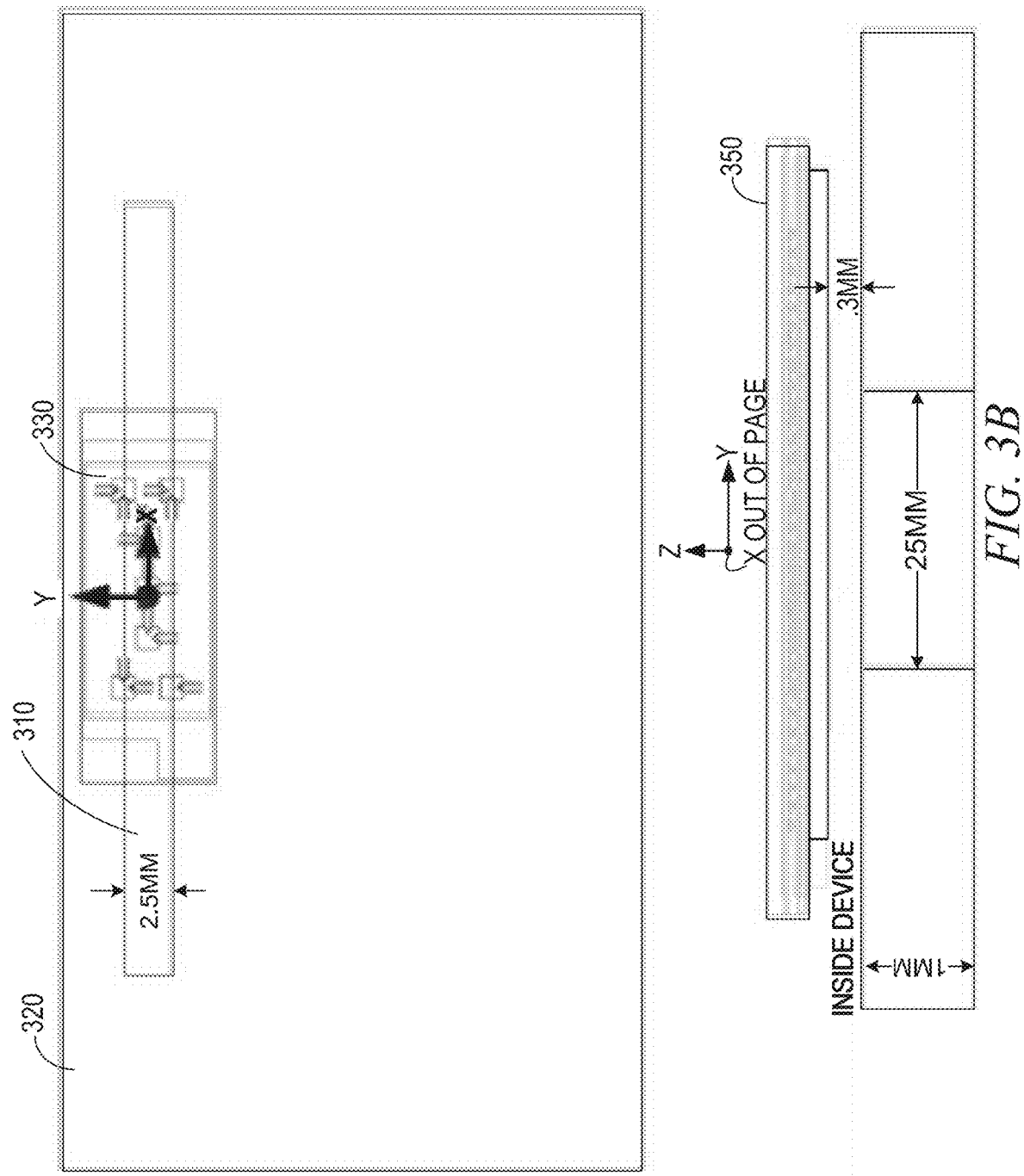
FIG. 3B illustrates exemplary two-dimensional view of the subwavelength slit of FIG. 3A looking from inside the client device toward the chassis, in accordance with some aspects of the present disclosure.

FIG. 3B illustrates a two-dimensional view 301 of the subwavelength slit 310 of FIG. 3A looking from inside the client device toward the chassis 320. Antenna array 350 is seen facing the cover from inside the client device. As can be seen, in one aspect of the present disclosure the spacing between the antenna array and the chassis is 0.3 mm. A 4×2 antenna element array may be used with the two rows of 4 elements being staggered in some aspects of the present disclosure.

Figure 3C:
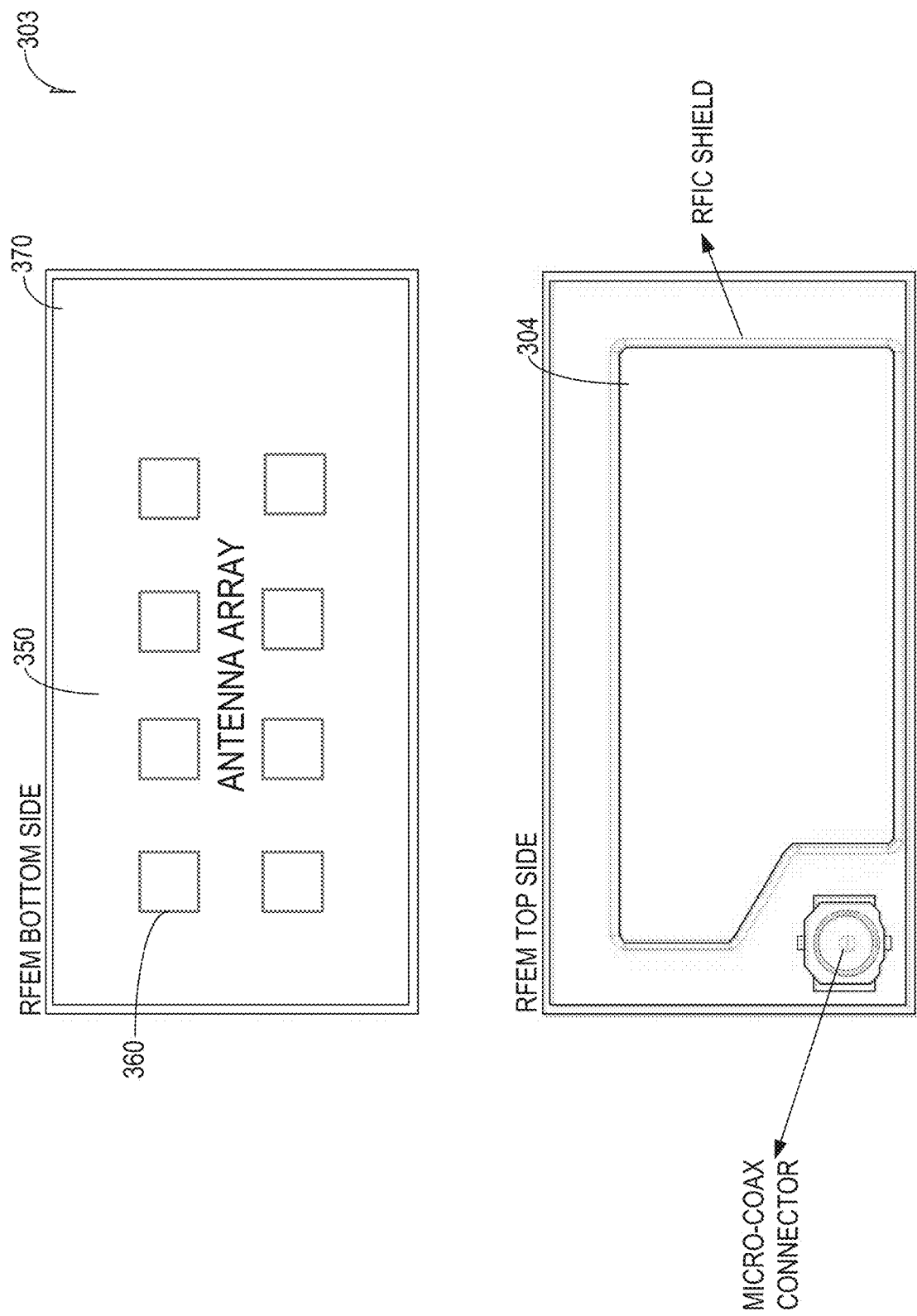
FIG. 3C illustrates exemplary two-dimensional antenna array in accordance with some aspects of the present disclosure.

FIG. 3C illustrates a two-dimensional antenna array 350 of patch antenna elements 360 in accordance with some aspects of the present disclosure. The area of placement of array 350 is in area 370 on the side of the RFEM facing the chassis. Also illustrated is the area of placement 304 for the processing flip chips on the side of the RFEM facing the client device.

Figure 4A:
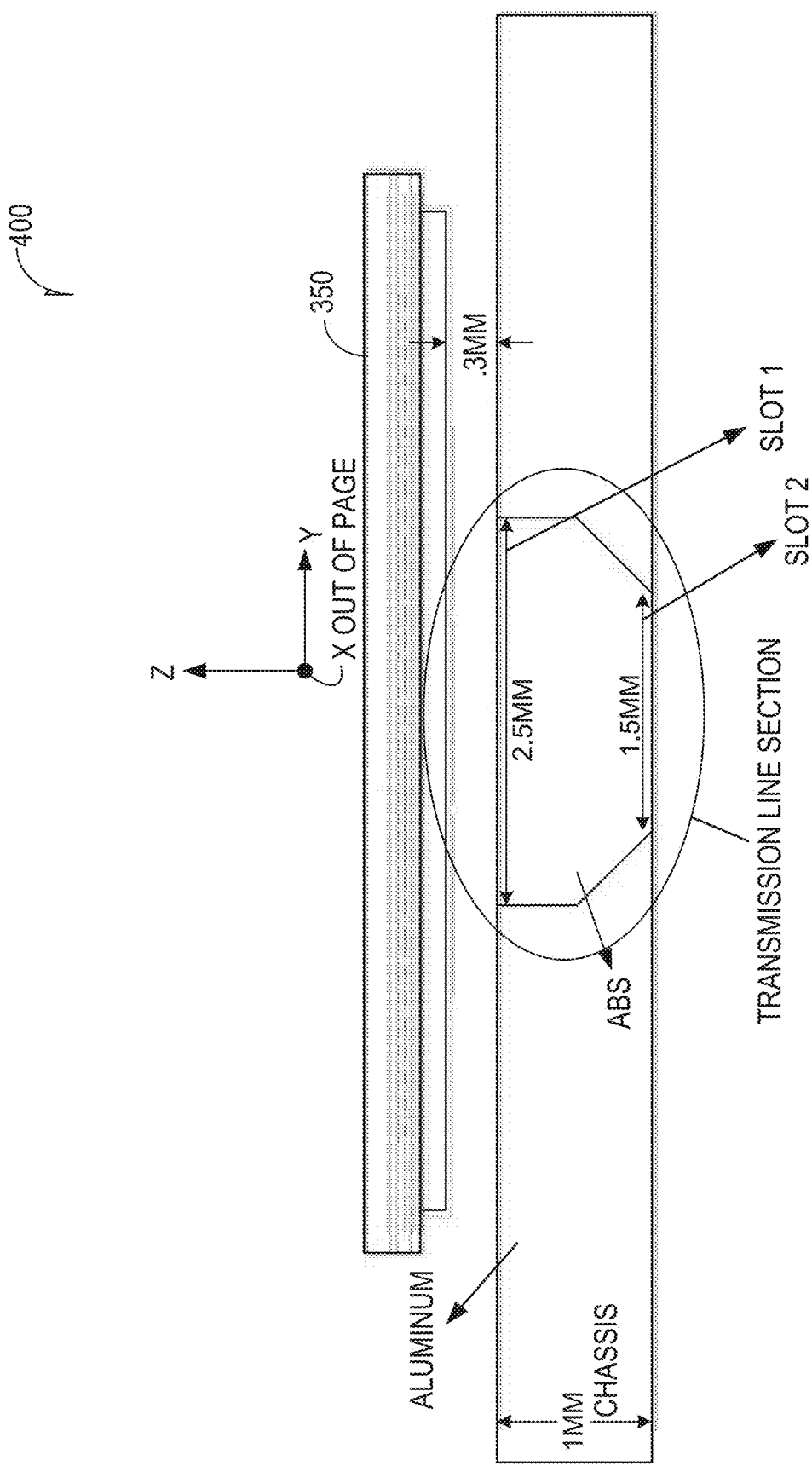
FIG. 4A illustrates an exemplary cross section of the subwavelength slit of FIGS. 3A and 3B showing two apertures on different surfaces of the chassis, operating as an enclosed transmission line section, in accordance with some aspects of the present disclosures.
Figure 4B:
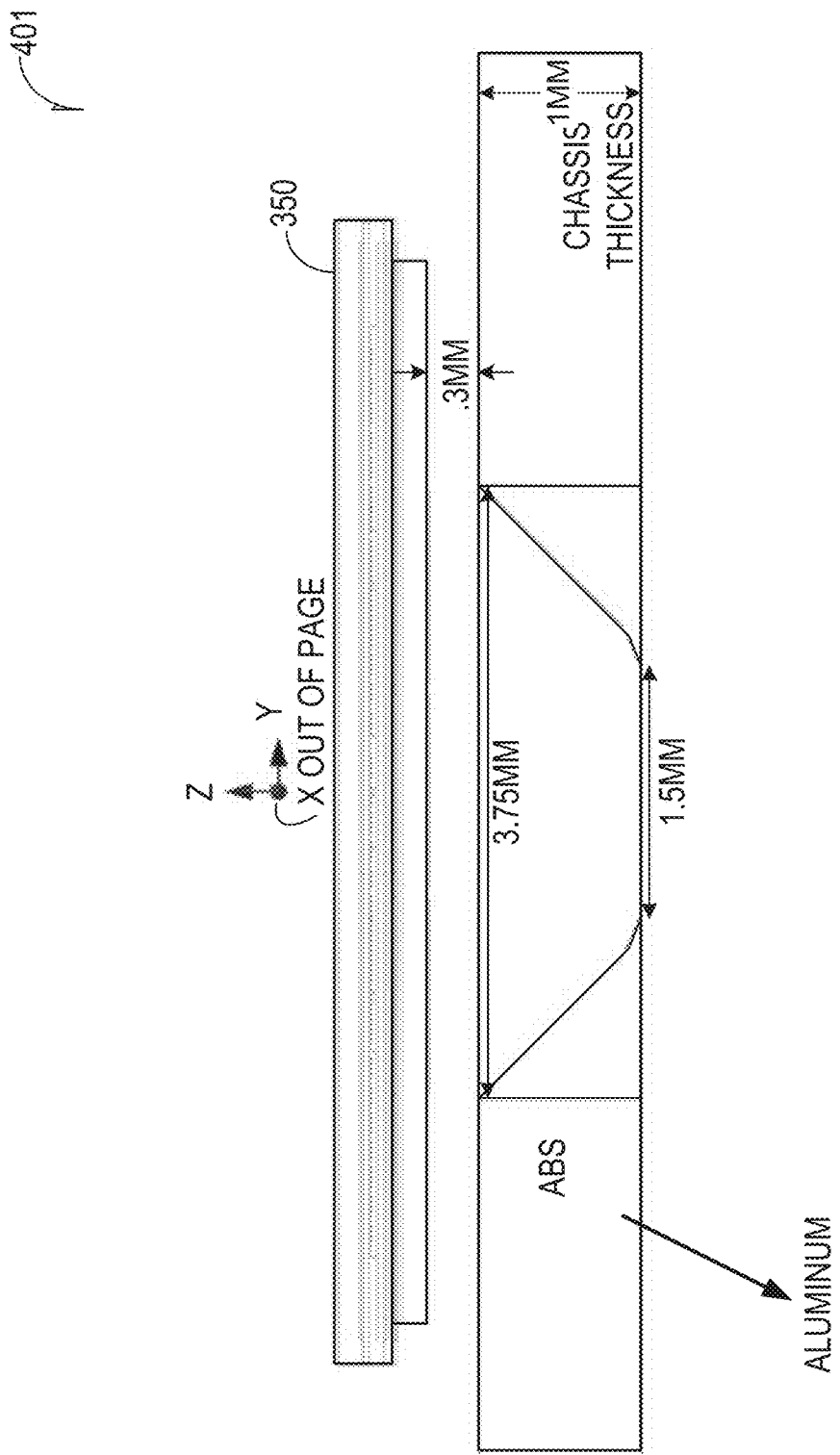
FIG. 4B illustrates another exemplary cross section of the subwavelength slit of FIGS. 3A and 3B, in accordance with some aspects of the present disclosure.
Figure 4C:
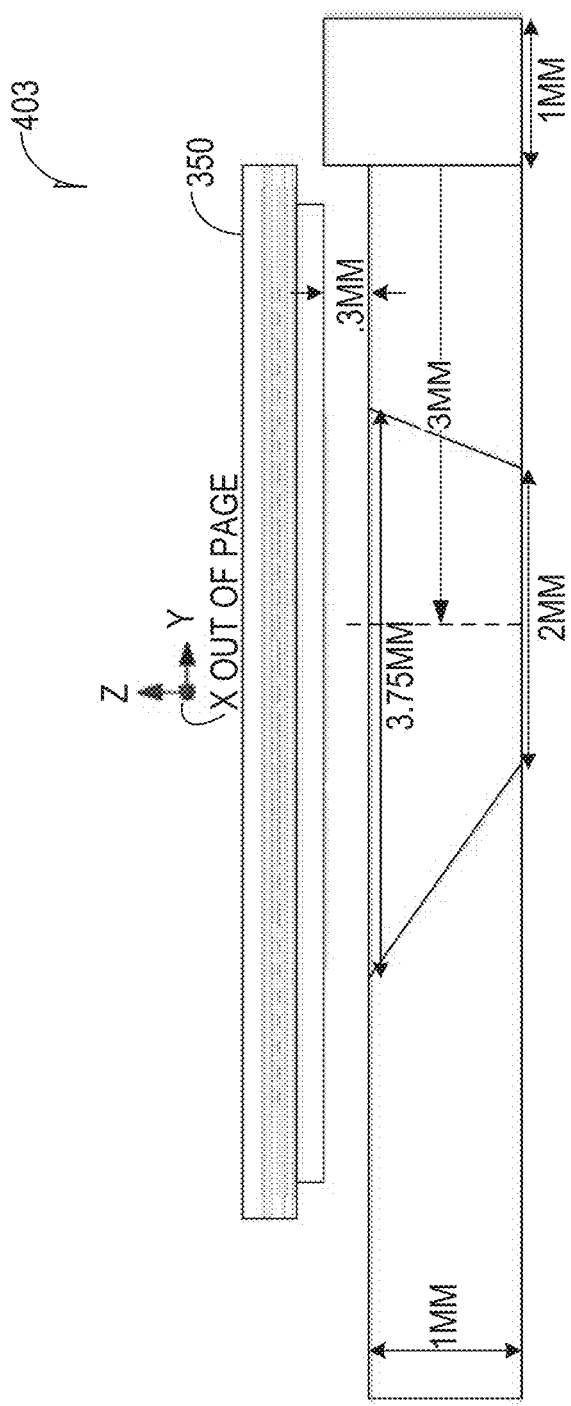
FIG. 4C illustrates yet another exemplary cross section of the subwavelength slit of FIGS. 3A and 3B, in accordance with some aspects of the present disclosure.
Figure 4D:
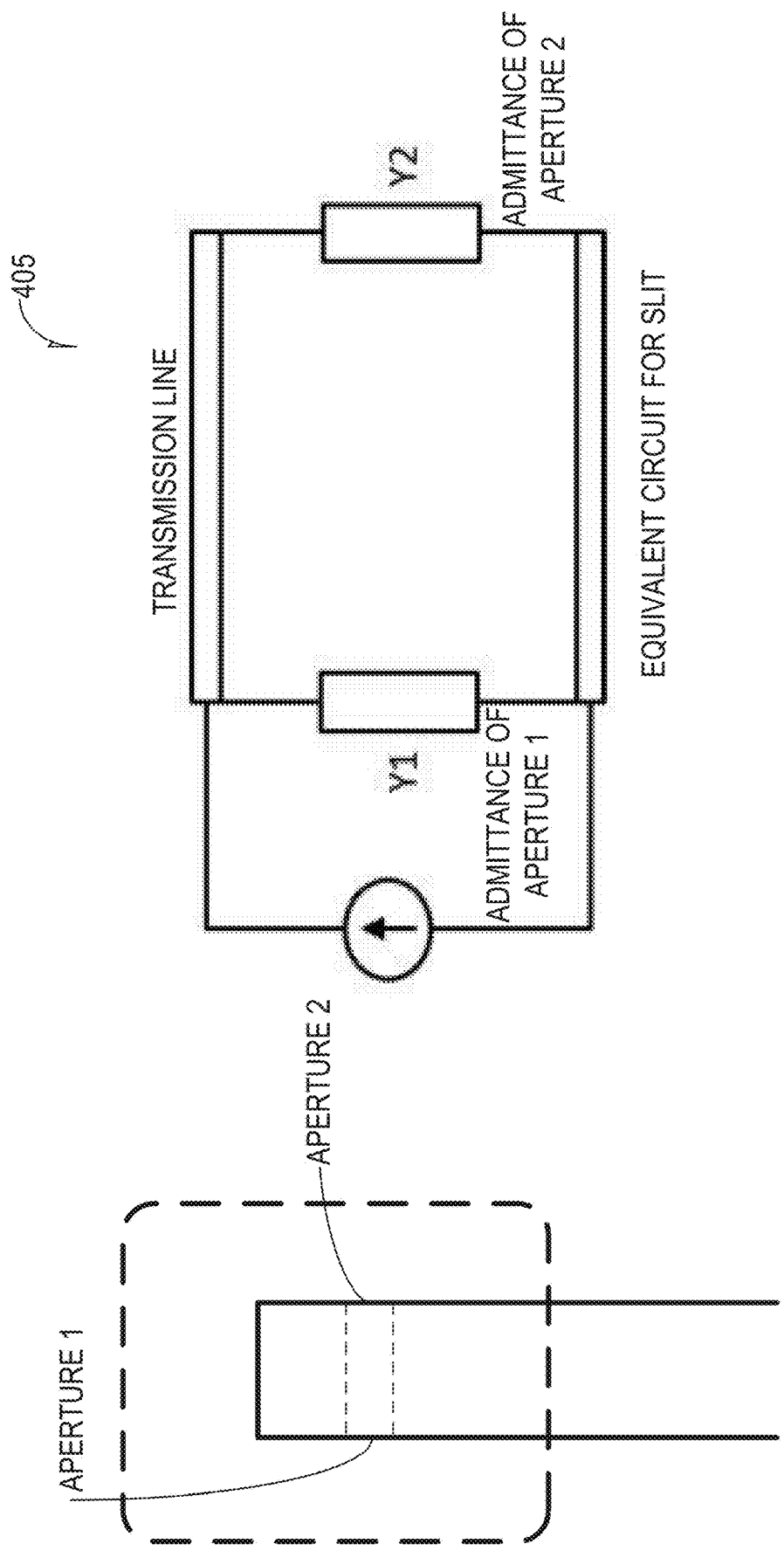
FIG. 4D is an exemplary representation of the equivalent circuit of the structure illustrated in FIGS. 4A, 4B, and 4C, in accordance with some aspects of the present disclosure.

FIG. 4A illustrates a cross section 400 of the subwavelength slit of FIGS. 3A and 3B in top view showing two apertures on different surfaces of the chassis, operating as an enclosed transmission line section. The physical channel (encircled), between sides of the chassis shows chamfering, with angles (which are typical on each side of the chassis) as shown. FIGS. 4B and 4C illustrate different chamfering patterns, with angles (again typical as drawn) shown in FIG. 4B. In addition, while linear chamfering is illustrated, the physical channel could also be curvilinear. FIG, 4D is a representation of the equivalent circuit of the structure illustrated in FIGS. 4A, 4B, and 4C. The area between the two apertures (slot 1 and slot 2) in the figures functions as a transmission line. By designing the profile so that the transmission line section is at resonance around 60 GHz in one aspect of the present disclosure, signals that impinge slot 1 (or the aperture of slit 1) can be transmitted with high efficiency to the aperture of slit 2. However, the transmission is also a function of chassis thickness. In some cases part of the chassis will have to be milled out to provide proper thickness. In others, material may have to be added. In this fashion, the chassis becomes an integral part of the radiating mechanism for the mmWave radio. The alignment of the radio module with respect to the slit is also material. In the current aspect of a single slit, it is desirable that the slit be much wider that the radio front end module, and that the radio module be place in the central region of the slit.

Figure 5A:
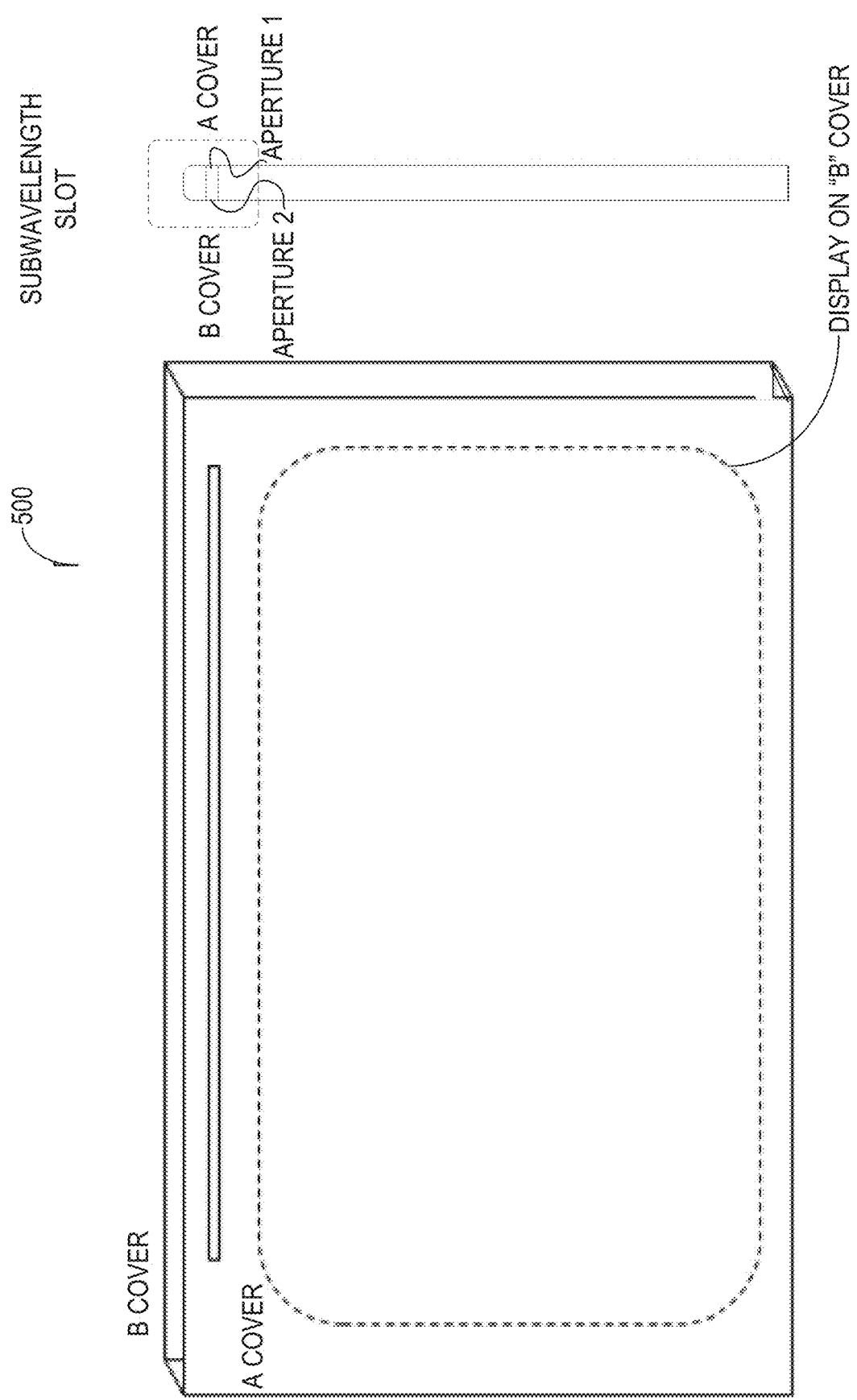
FIG. 5A illustrates an exemplary three dimensional view of the subwavelength slit of FIG. 3A in a chassis that comprises a cover of a client device, in accordance with some aspects of the present disclosure.
Figure 5B:
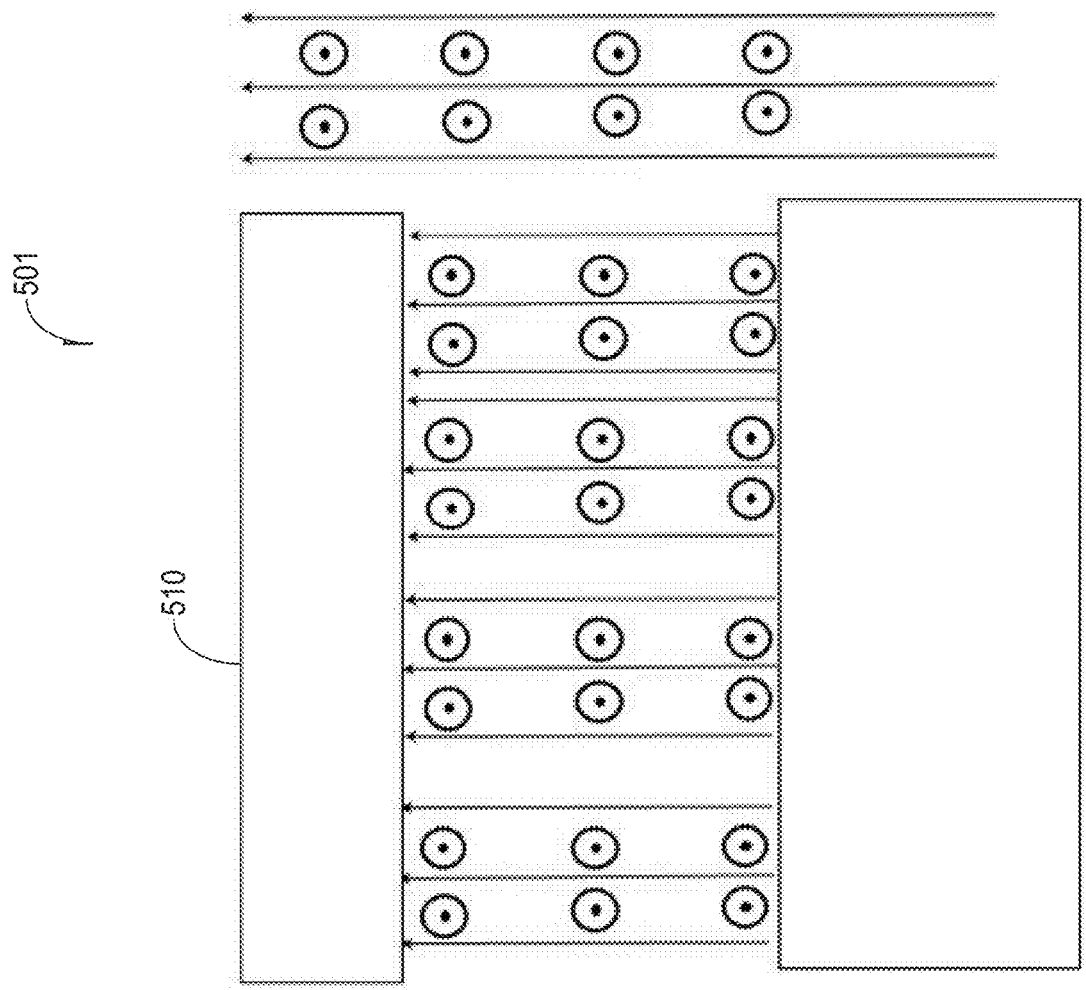
FIG. 5B illustrates exemplary field distribution within the subwavelength slit of, and across, the chassis of, the cover of FIG. 5A, in accordance with some aspects of the present disclosure.
Figure 5B:
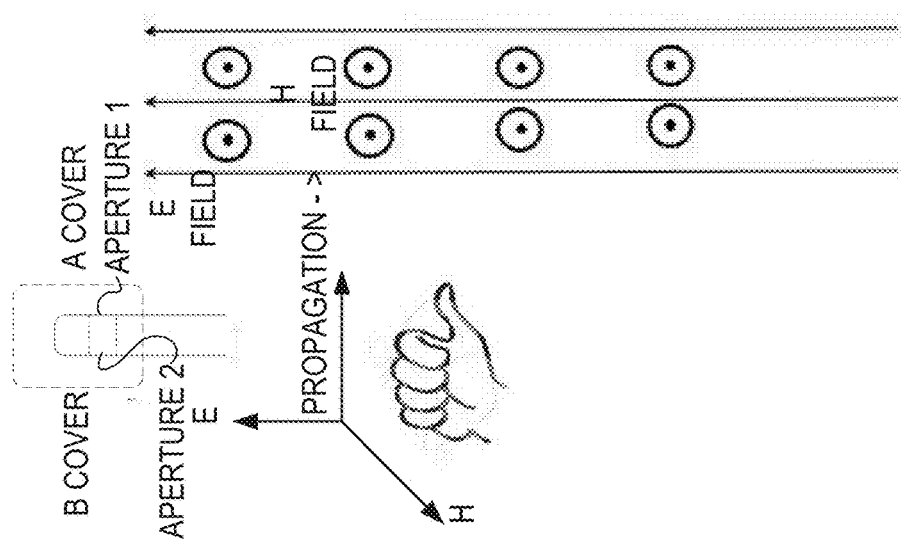

FIG. 5A illustrates a three dimensional view 500 of the subwavelength slit of FIG. 3A in a chassis 510 that comprises a cover of a client device, in accordance with some aspects of the present disclosure. The A Cover facing free space and the B Cover facing the inside of the client device is seen. FIG. 5B illustrates AT 501 one example of field distribution within the subwavelength slit of, and across, the chassis of, the cover 510 of FIG. 5A, in accordance with some aspects of the present disclosure. An important principle is the use of an optimized slit cross section, slit width and chassis thickness to setup a resonant transmission line mode in the slit. As illustrated by the fields in the slit within chassis 510. Such a transmission line mode allows for most of the radiation impinging on side of the chassis to be transmitted to the outer edge facing free space, despite the dimensions being subwavelength, as indicated by the field approaching the out edge of the chasses (not shown but coextensive with line 510). The Transverse Electromagnetic Mode (TEM mode) is shown to be propagating through the chassis apertures in FIG. 5B. Such a mode, also called a transmission line mode, is distinguished by the absence of a "cut off" frequency, where the cut off frequency for a mode in a waveguide is defined as the lowest frequency that can propagate through the waveguide.

Figure 6:
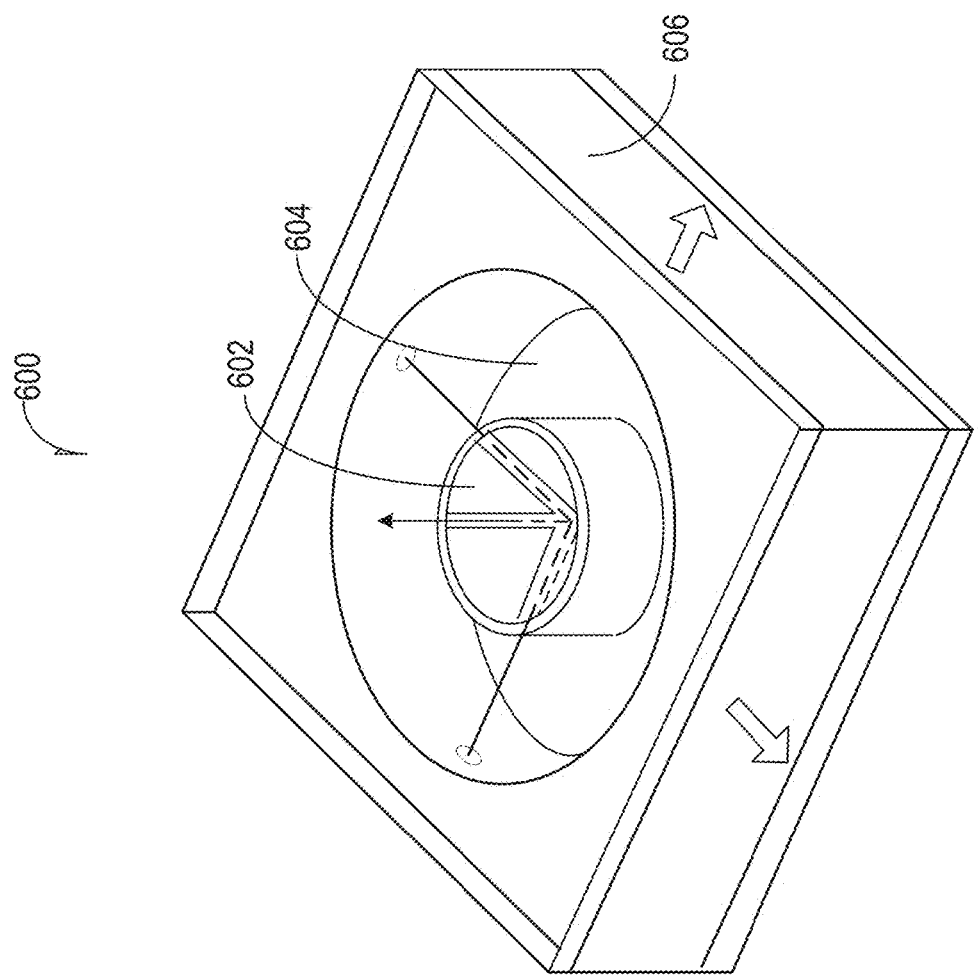
FIG. 6 illustrates an alternate exemplary structure that may be used in place of the structures of FIGS. 3A, 3B and 3C, according to some aspects of the present disclosure.
Figure 6:
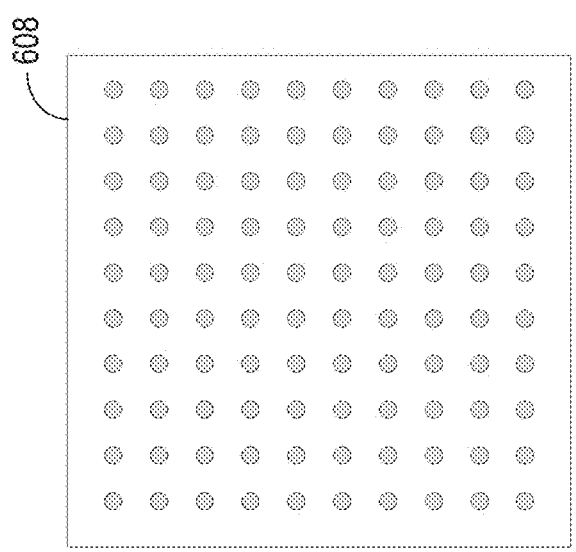

FIG. 6 illustrates at 600 an alternate structure that may be used in place of the structures of FIGS. 3A, 3B and 3C, according to some aspects of the present disclosure. The elements of antanna array 601 may be arranged as if they were a plurality of coaxial cables. In other words each element may comprise a round cylinder 604 with a cylindrical stub 602 inside. While this is illustrated as a round cylinder and a circular stub, this may be any shape including, without limitation, rectilinear, triangular, and the like, so long as there is an inner conductor and an outer conductor configured so as to support TEM waves. The alternate structure of FIG. 6 is a unit cell of an array with dimensions of the cylinder radius being 0.5 millimeter, the hole radius being 1.25 millimeters, and the thickness of the metal 606 being 0.9 millimeter, according to one aspect of the present disclosure. An array of these arranged next to each other would be equivalent to a parallel plate. ABS may be used as an example of a filler between the cylinder. Generally, alternate structures that can support Trasverse Electrmagnetic Modes (TEM) use two conductors of any profile, an inner conductor and an outer conductor. A very wide slit (parallel plate waveguide) like the single slit that also supports TEM waves. As discussed briefly above, these modes do not have a cut off frequency (or in practice have very low cutoff frequencies). Below this cut off frequency, a wave cannot travel through a waveguide.

Figure 7:
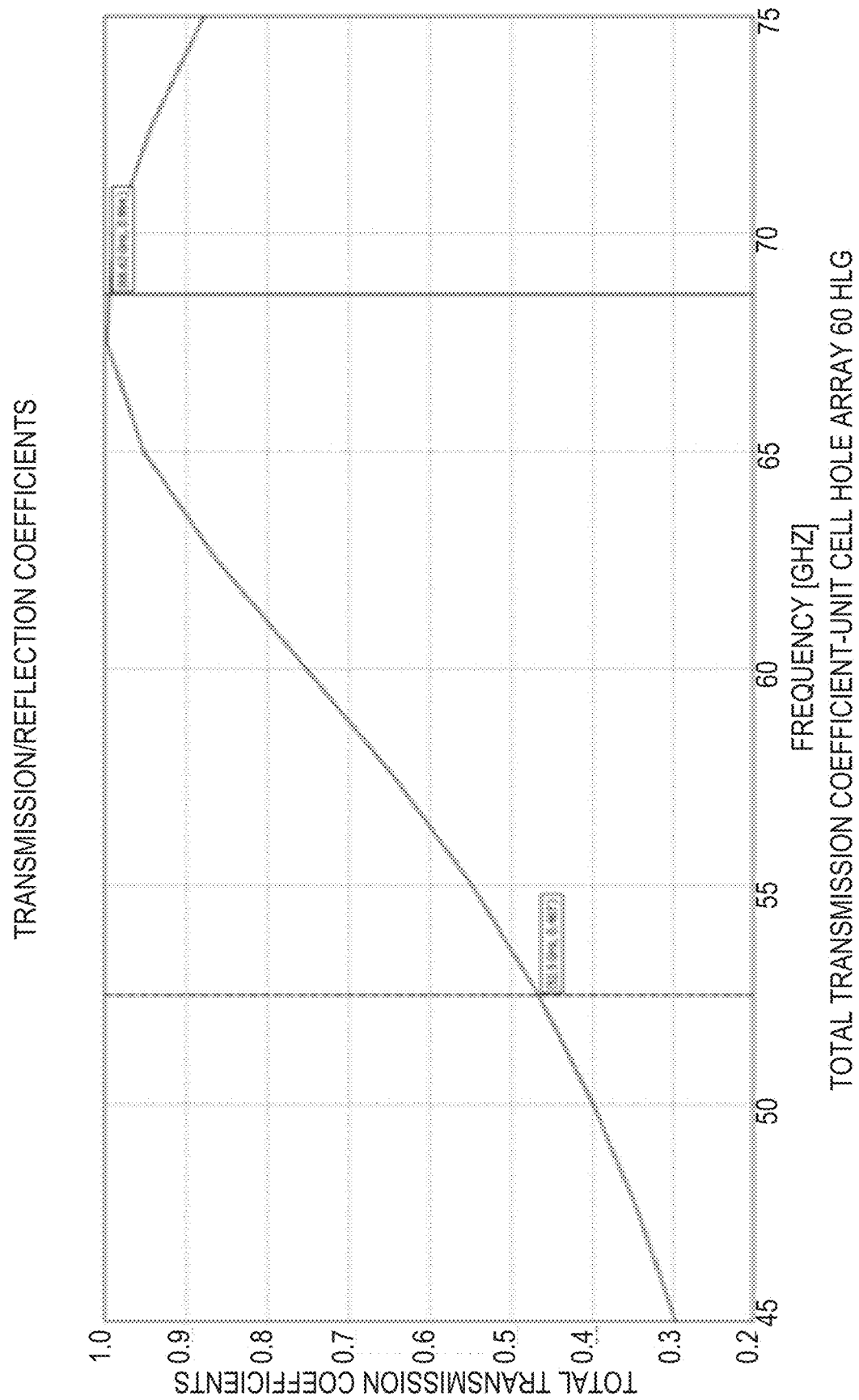
FIG. 7 is a plot of exemplary transmission measuring the ratio of energy transfer from one side of assumed infinite 2D array of unit cell structures for one thickness of the chassis, according to some aspects of the present disclosure.

FIG. 7 is a plot of the transmission coefficient measuring the ratio of energy transfer from one side of an assumed infinite 2D array of unit cell structures, one example being the one seen in FIG. 6, for one thickness of the chassis, according to some aspects of the present disclosure. The transmission coefficient depends on chassis thickness. For the plot in the illustration, the chassis thickness of the chassis is equal to 0.8 mm. The figure illustrates a scan from 45 GHz to 70 GHz. In that range there was one peak and one null, which can be clearly seen in the figure. For the case illustrated, lamda/5.5=0.8 mm is the peak.

Figure 8:
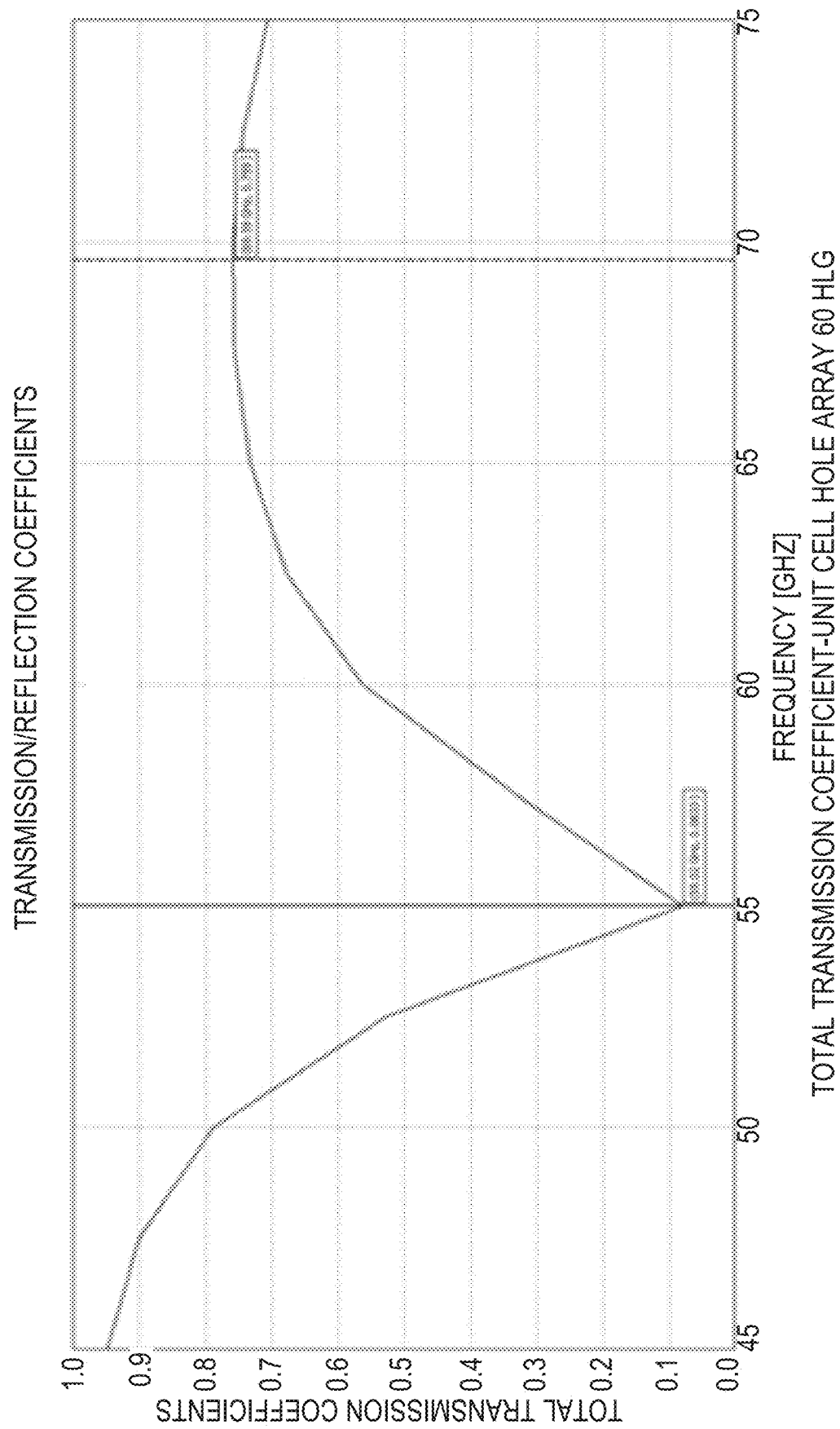
FIG. 8 is a plot of exemplary transmission measuring the ratio of energy transfer from one side of assumed infinite 2D array of unit cell structures for another thickness of the chassis, according to some aspects of the present disclosure.

FIG. 8 is a plot of the transmission coefficient measuring the ratio of energy transfer from one side of assumed infinite 2D array of unit cell structures for another thickness of the chassis, according to some aspects of the present disclosure. The scan range is the same as for FIG. 7. The thickness of the chassis is 0.928 mm. The transmission coefficient versus frequency curve is different from that of FIG. 7 due to the difference in chassis thickness, clearly illustrating the dependence of frequency of transmission on chassis thickness. For the illustrated plot, the formula for the null, in this case is lamda/5.877=0.928 mm. It is clear that the frequency of transmission is dependent on chassis thickness when sub-wavelength features (for example, 2.5 mm diameter) are used at approximately 50 to 70 GHz. In addition, the thickness of the chassis may vary, for some aspects of the present disclosure, from lambda/10 to lambda/3, well below half a wavelength.

Figure 9:
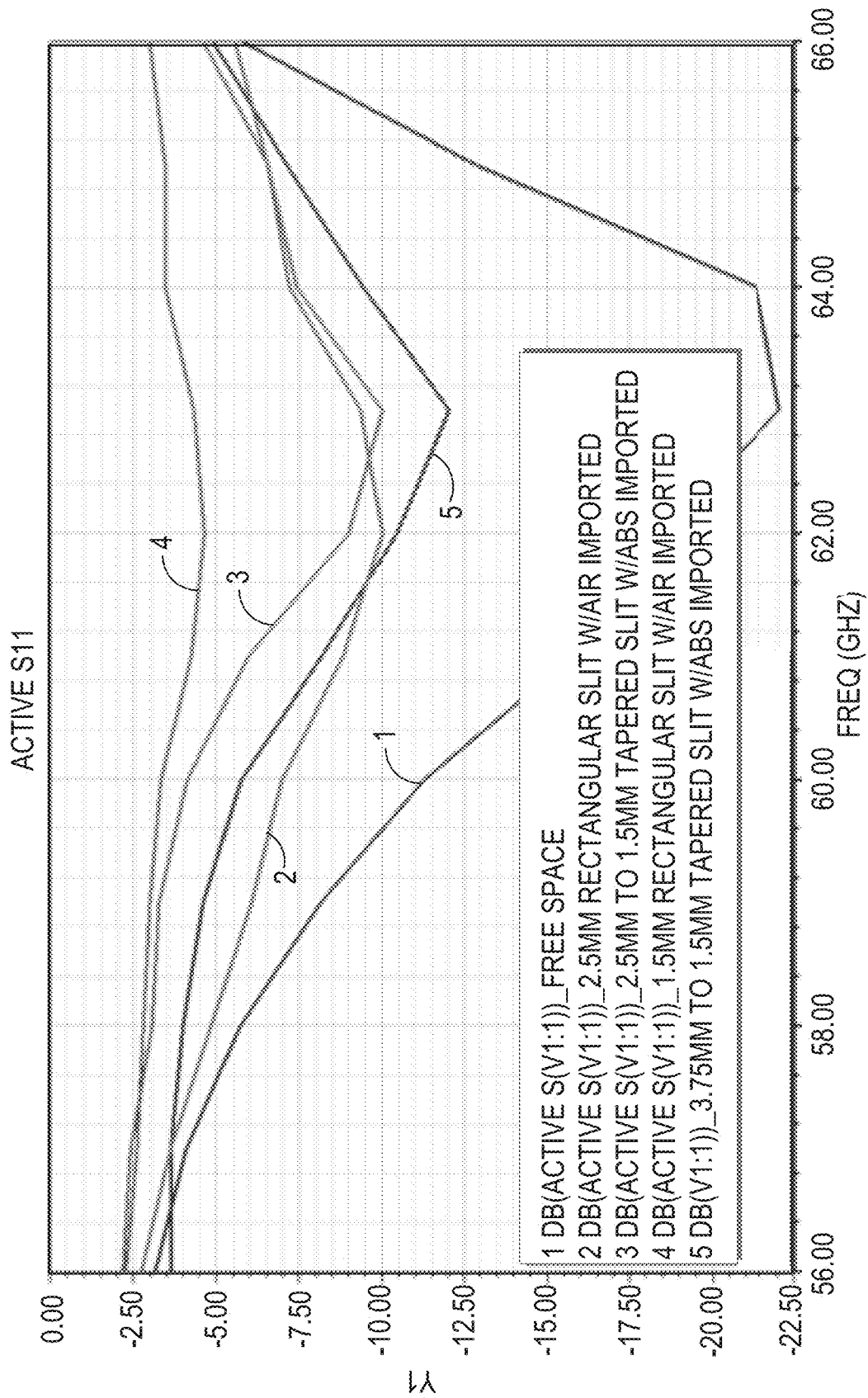
FIG. 9 is a plot of exemplary Active Return Loss for the structures of FIGS. 4A, 4B, and 4C, free space and air, in accordance with some aspects of the present disclosure.

Simulation studies have been conducted on the transmission (as measured by Antenna Array Gain and impact on return loss) for various slit profiles and widths. A representative simulation setup and simulated return loss, and array again are included in FIGS. 9 through 12. FIG. 9 shows the impact on return loss of integrating a RFEM module close to a slit in a chassis, for various slit cross sections. The data for each curve, 1, 2, 3, 4, and 5 are seen in the table in the drawing. It is noted that return loss is least for a RFEM module in free space and progressively deteriorates for larger tapers. It is also noted that a taper-less slit of 2.5 mm cross section shows the least detereoration in return loss compared to the free space case, and that a 1.5 mm taperless slit causes the most degradation. The tapering is thus able to restore some of the losses resulting from a the use of a very narrow slit. FIG. 4B has a higher taper 3.75 mm to 1.5 mm. FIG. 4C has less taper 3.75 mm to 2 mm. Consequenetly a single plot compares the "worst case, i.e., 3.75 mm to 1.5 mm taper" performance with that of Free Space (baseline). Hence only those traces are included. All others are bounded by these two curves.

Figure 10:
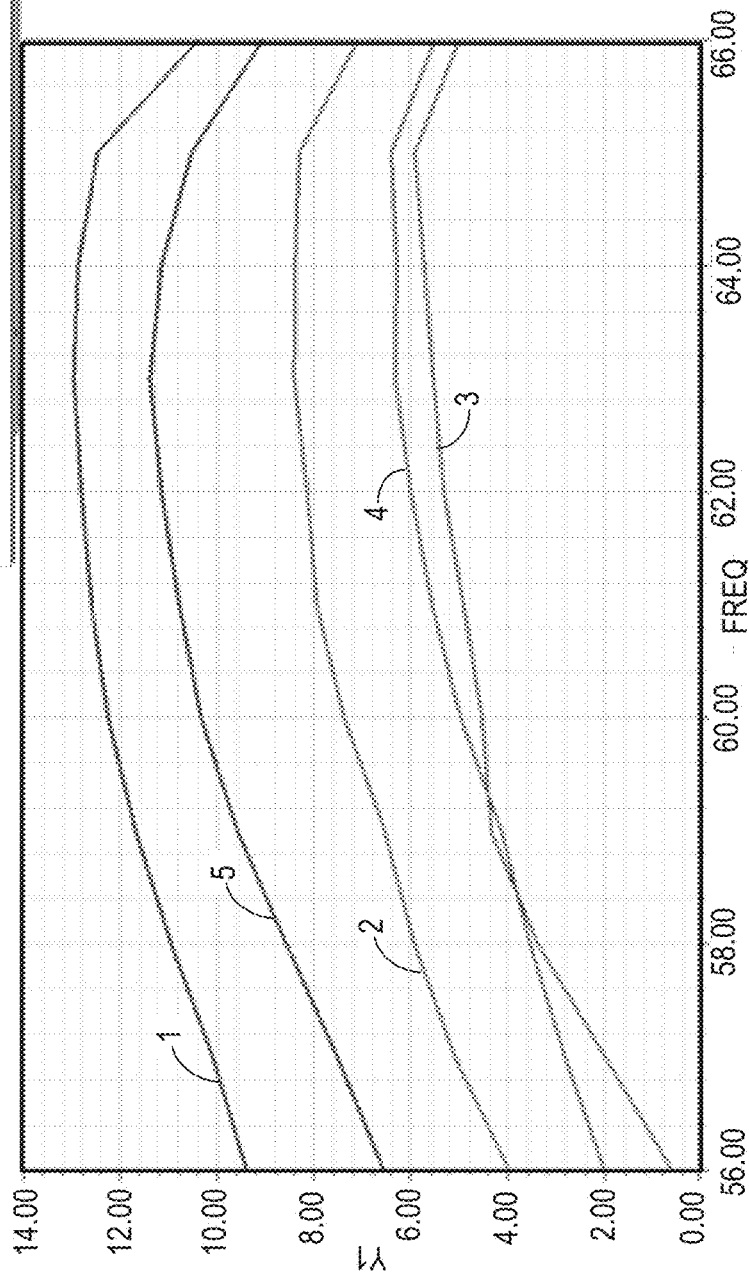
FIG. 10 is a plot of exemplary broadside realized gain, Vpol showing admittance versus frequency for the structures of FIGS. 4A, 4B, and 4C, free space and air, in accordance with some aspects of the present disclosure.

FIG. 10 is a plot of broadside realized gain, Vpol showing admittance versus frequency for the structures of FIGS. 4A, 4B, and 4C, free space and air, in accordance with some aspects of the present disclosure. The data for each curve, 1, 2, 3, 4, and 5 are seen in the table in the drawing.

Figure 11:
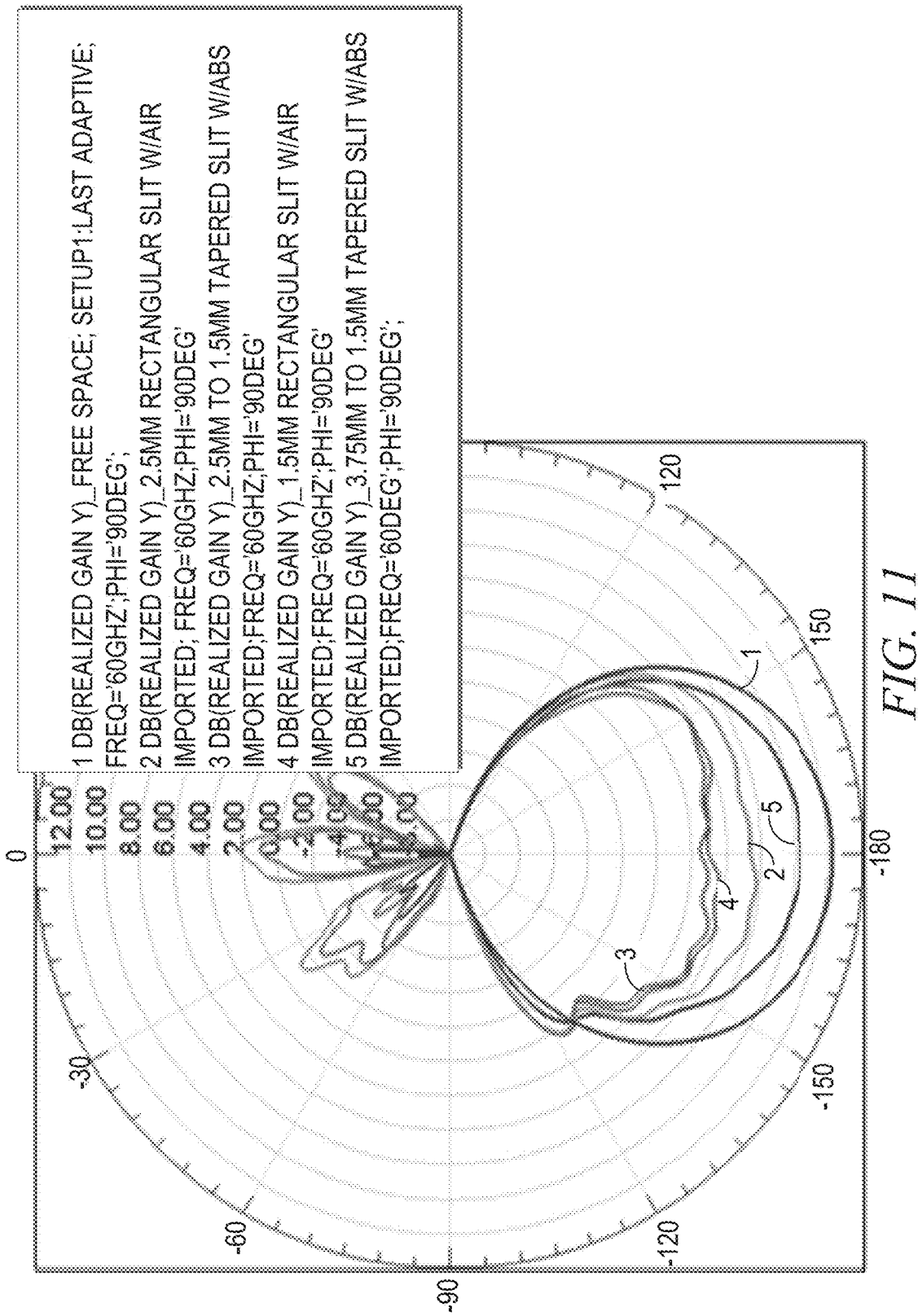
FIG. 11 is a plot of exemplary radiation pattern for the structures of FIGS. 4A, 4B, and 4C, free space and air, in accordance with some aspects of the present disclosure.

FIG. 11 is a plot of radiation pattern for the structures of FIGS. 4A, 4B, and 4C, free space and air, in accordance with some aspects of the present disclosure. Data for the patterns 1, 2, 3, 4, and 5 are seen in the table associated with FIG. 11.

Figure 12:
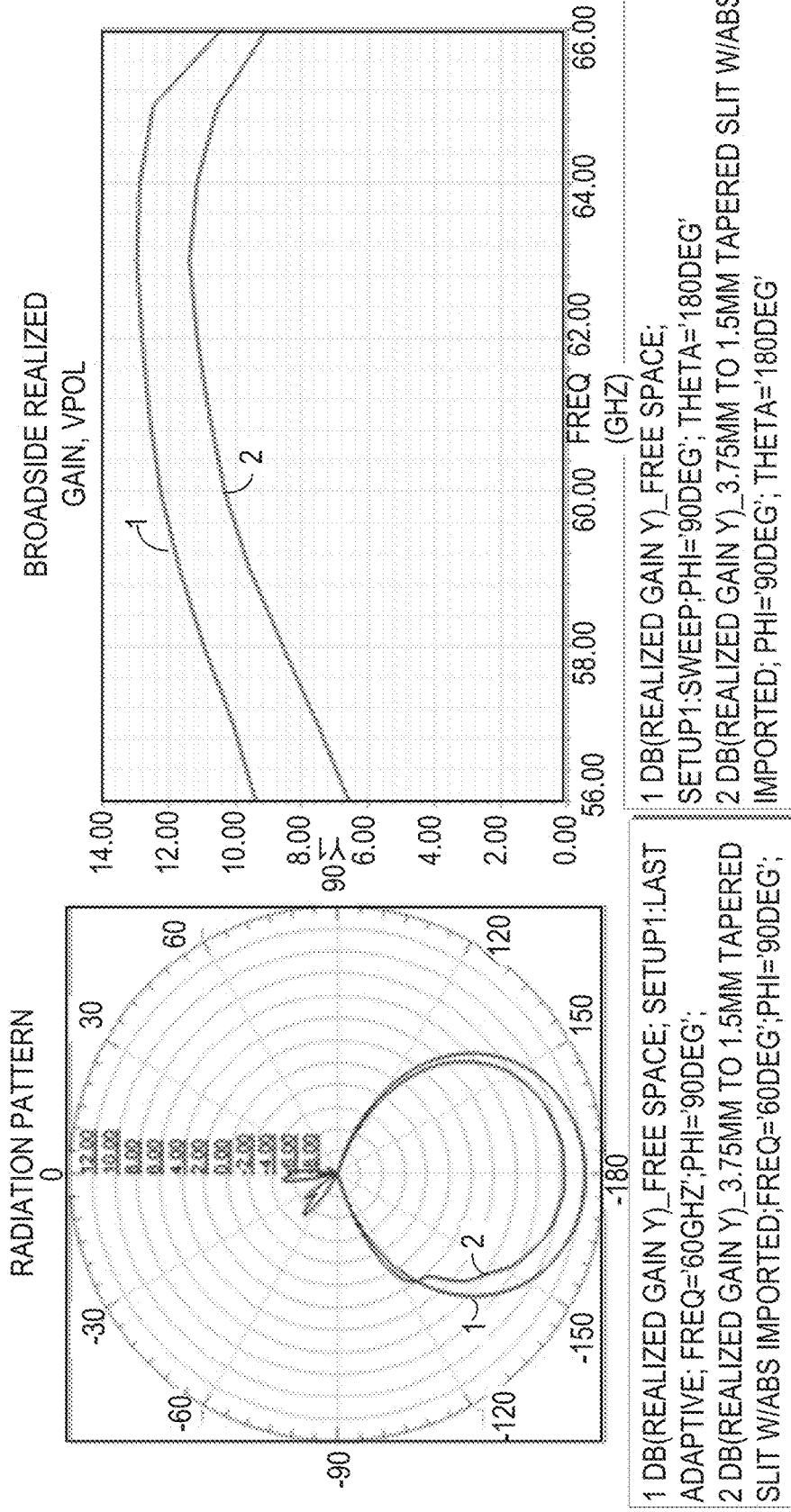
FIG. 12 is a plot of exemplary radiation pattern and broad side gain for the structure FIGS. 4B and 4C, in accordance with some aspects of the present disclosure.

FIG. 12 is a plot of radiation pattern and broad side gain for the structure FIGS. 4B and 4C, in accordance with some aspects of the present disclosure. Data for the radiation patterns 1, and 2 are seen in the table associated with the radiation pattern. Data for broadside gain for curves 1, and 2 are seen in the table associated with the Broadside Realized Gain Vpol drawing.

Figure 13:
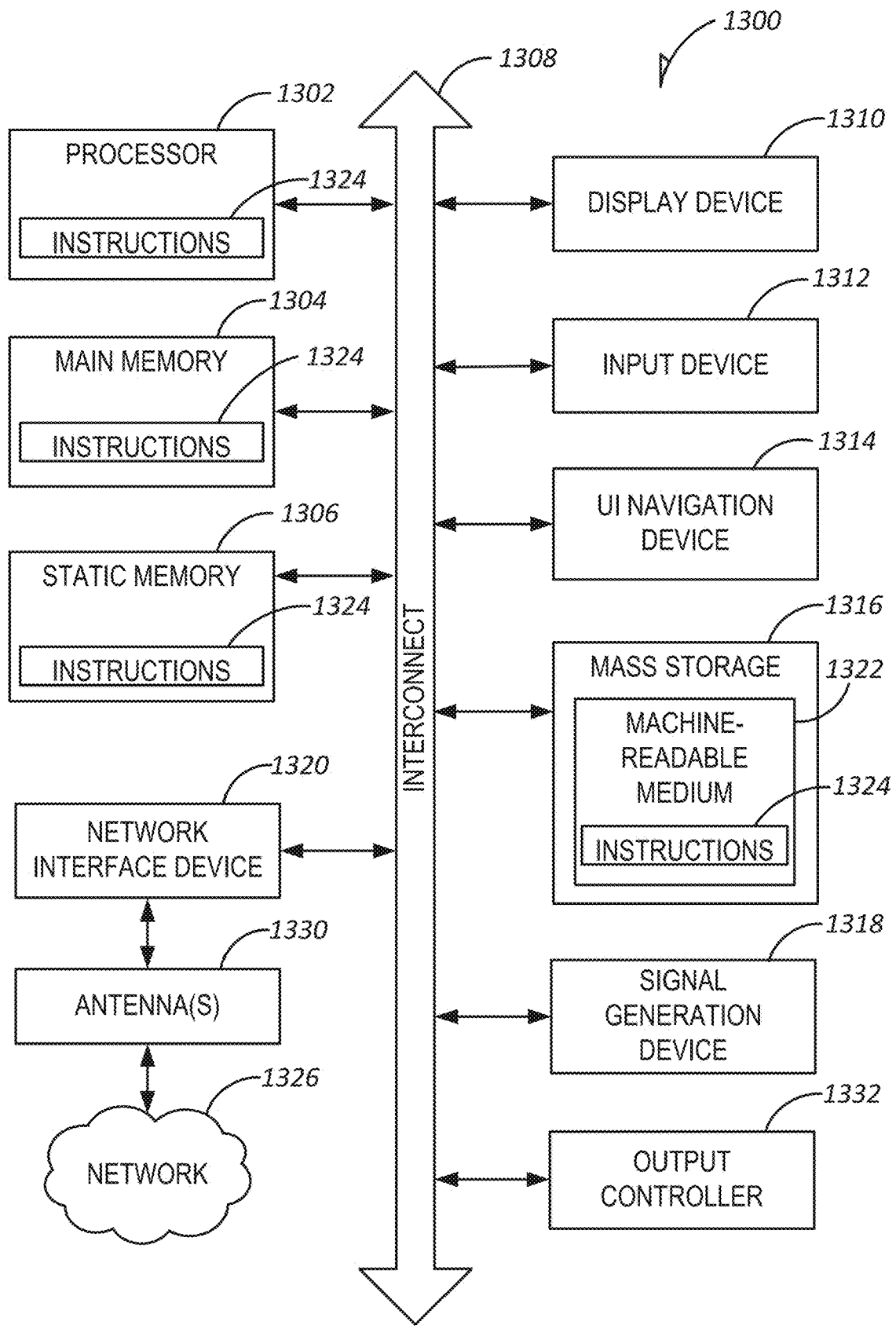
FIG. 13 illustrates a block diagram of an example machine, in accordance with some aspects of the present disclosure.

FIG. 13 illustrates a block diagram of an example machine 1300 in accordance with some aspects of the present disclosure upon which any one or more of the techniques (e.g., methodologies) discussed herein may perform. In alternative aspects of the present disclosure, the machine 1300 may operate as a standalone device or may be connected (e.g., networked) to other machines in a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a UE, eNodeB, AP, STA, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 may be a touch screen display. The machine 1300 may additionally include a storage device (e.g., drive unit) 1316, a signal generation device 1318 (e.g., a speaker), a network interface device 1320, and one or more sensors, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared (IR), near field communication (NFC), and the like.) connection to communicate or control one or more peripheral devices (e.g., a printer, card reader, and the like).

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine. In an example, one or any combination of the hardware processor 1302, the main memory 1304, the static memory 1306, or the storage device 1316 may constitute machine readable media.

While the machine readable medium 132.2 is illustrated as a single medium, the term "machine readable medium" may include a single medium or multiple media (e.g., a centralized or distributed database, and/or associated caches and servers) configured to store the one or more instructions 1324.

The term "machine readable medium" may include any medium that is capable of storing, encoding, or carrying instructions for execution by the machine and that cause the machine to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), and the like). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), multiple-input multiple-output (MIMO), or multiple-input single-output (MISO) techniques. In some examples, the network interface device 1320 may wirelessly communicate using Multiple User MIMO techniques. The term "transmission medium" shall be taken to include any intangible medium that is capable of storing, encoding or carrying instructions for execution by the machine, and includes digital or analog communications signals or other intangible medium to facilitate communication of such software.

EXAMPLES

Example 1 is a mobile device configured to transmit a signal at a transmit frequency, the mobile device comprising: a chassis having a slit along one dimension of the chassis, wherein a first aperture of the slit faces a first direction internal to the mobile device, the first aperture having a dimension that comprises a first subwavelength of the transmit frequency; and a second aperture of the slit that faces a direction opposite to the first direction, the second aperture having a dimension that comprises a second subwavelength of the transmit frequency, wherein the slit comprises a channel that connects the first aperture and the second aperture, to support a transverse electromagnetic mode for propagation of the signal from the first aperture through the channel to the second aperture, wherein an antenna array within the chassis comprises a primary radiator within the mobile device to irradiate the first aperture, and wherein the chassis is configured as a secondary radiator.

In Example 2, the subject matter of Example 1 optionally includes wherein the first subwavelength of the transmit frequency is substantially equal to the second subwavelength of the transmit frequency.

In Example 3, the subject matter of any one or more of Examples 1-2 optionally include wherein the thickness of the slit comprises an odd multiple of the wavelength of the transmit frequency to provide phase addition when the primary radiator irradiates the first aperture.

In Example 4, the subject matter of any one or more of Examples 1-3 optionally include wherein a dimension of the first aperture is different from a dimension of the second aperture, and the channel comprises linearly chamfered surfaces.

In Example 5, the subject matter of any one or more of Examples 1-4 optionally include wherein a dimension of the first aperture is different from a dimension of the second aperture, and the channel comprises curvilinear surfaces.

In Example 6, the subject matter of any one or more of Examples 1-5 optionally include wherein the first aperture, the second aperture, a cross section of the channel, and channel thickness comprise a transmission line that supports the transverse electromagnetic mode.

In Example 7, the subject matter of any one or more of Examples 1-6 optionally include wherein the slit comprises a length dimension, and the antenna array is centered along the length dimension of the slit.

In Example 8, the subject matter of any one or more of Examples 1-7 optionally include wherein the transmit frequency is in a millimeter wave band in a 5G wireless communication network.

Example 9 is a chassis for a mobile device comprising: a cover having a slit along one dimension of the cover wherein the cover is configured to receive a transceiver coupled to an antenna array that is configured to transmit a signal at a transmit frequency; a first aperture of the slit configured to face a first direction internal to the mobile device, the first aperture having a dimension that comprises a first subwavelength of the transmit frequency; and a second aperture of the slit configured to face a direction opposite to the first direction, the second aperture having a dimension that comprises a second subwavelength of the transmit frequency, wherein the slit comprises a channel that connects the first aperture and the second aperture, and wherein the channel is configured to support a transverse electromagnetic mode for propagation of the signal from the first aperture through the channel to the second aperture when the first aperture is irradiated by the antenna array.

In Example 10, the subject matter of Example 9 optionally includes wherein the cover is configured to function as a radiator.

In Example 11, the subject matter of any one or more of Examples 9-10 optionally include wherein the first aperture dimension and the second aperture dimension are each configured to be about a quarter wavelength of the frequency.

In Example 12, the subject matter of any one or more of Examples 9-11 optionally include wherein the thickness of the cover is an odd multiple of a wavelength of the transmit frequency, to provide phase addition when the first aperture is irradiated by the antenna array.

In Example 13, the subject matter of any one or more of Examples 9-12 optionally include wherein the first aperture dimension is a different subwavelength of the transmit frequency than the second aperture dimension, and the channel comprises chamfered surfaces.

In Example 14, the subject matter of any one or more of Examples 9-13 optionally include wherein the first dimension is a different subwavelength of the transmit frequency than the second dimension, and the channel comprises curvilinear surfaces.

In Example 15, the subject matter of any one or more of Examples 9-14 optionally include wherein the antenna array comprises a plurality of antenna elements each comprising patches, or a plurality of antenna elements each comprising an inner conductor and an outer conductor and having a dielectric between the inner conductor and the outer conductor.

In Example 16, the subject matter of any one or more of Examples 9-15 optionally include wherein the first aperture, the second aperture, a cross section of the channel, and channel thickness comprise a transmission line that supports the transverse electromagnetic mode.

In Example 17, the subject matter of any one or more of Examples 9-16 optionally include wherein the slit has a length dimension, and the antenna array is centered along the length dimension of the slit at a distance from the chassis of a subwavelength of the transmit frequency.

In Example 18, the subject matter of any one or more of Examples 9-17 optionally include wherein the transmit frequency is in a millimeter wave band in a 5G network.

Example 19 is a method of operating a mobile device comprising: sending a signal to at least one Evolved Node B (eNB) from a transceiver via an antenna array that is configured to transmit the signal at a transmit frequency, wherein the transceiver is coupled to the antenna array within a chassis, wherein the chassis has a slit along one dimension of the chassis, wherein a first aperture of the slit is configured to face a first direction internal to the mobile device, the first aperture having a dimension that comprises a first subwavelength of the transmit frequency, wherein a second aperture of the slit is configured to face a direction opposite to the first direction, the second aperture having a dimension that comprises a second subwavelength of the transmit frequency, wherein the slit comprises a channel that connects the first aperture and the second aperture, wherein the channel is configured to support a transverse electromagnetic mode for propagation of the signal from the first aperture through the channel to the second aperture, and wherein when the first aperture is irradiated by the antenna array, the chassis functions as a secondary radiator; and receiving a return signal from at least one eNB via the antenna array.

In Example 20, the subject matter of Example 19 optionally includes wherein the mobile device is configured to operate with a 3GPP LTE cellular network.

In Example 21, the subject matter of any one or more of Examples 19-20 optionally include wherein the mobile device is a communication station (STA) configured to operate in a Wi-Fi network.

In Example 22, the subject matter of any one or more of Examples 19-21 optionally include wherein the transmit frequency is in a millimeter wave band, and the mobile device and the at least one eNB are in a 5G network.

Example 23 is a mobile device comprising: a transceiver coupled to an antenna array that is configured to operate as a primary radiator and transmit a signal at a first transmit frequency, the transceiver and antenna array situated within a chassis that has a slit along one dimension; a first side of the chassis configured to face a first direction internal to the mobile device and including a first dimension of the slit that comprises a first aperture, the first dimension being a first subwavelength of the transmit frequency; a second side of the chassis configured to face free space and having a second dimension of the slit that comprises a second aperture, the second dimension being a second subwavelength of the transmit frequency; and a channel in the chassis that connects the first aperture and the second aperture, wherein the antenna array is configured to face the first side of the chassis to transmit the signal to the first aperture, the channel is configured to support a transverse electromagnetic mode for propagation of the signal from the first aperture through the channel to the second aperture, and the chassis, when irradiated by the primary radiator, functions as a secondary radiator.

In Example 24, the subject matter of Example 23 optionally includes wherein the first aperture, the second aperture, a cross section of the channel, and channel thickness comprises a transmission line that supports the transverse electromagnetic mode.

In Example 25, the subject matter of any one or more of Examples 23-24 optionally include wherein the slit has a length dimension, and the antenna array is centered along the length dimension of the slit at a distance of a subwavelength of the transmit frequency from the chassis.

In Example 26, the subject matter of any one or more of Examples 23-25 optionally include wherein the antenna array comprises a plurality of antenna elements each comprising patches, or a plurality of antenna elements each comprising an inner conductor and an outer conductor and having a dielectric between the inner conductor and the outer conductor.

In Example 27, the subject matter can include, or can optionally be combined with any portion or combination of, any portions of any one or more of Examples 1 through 26 to include, subject matter that can include means for performing any one or more of the functions of Examples 1 through 26, or a machine-readable medium including instructions that, when performed by a machine, cause the machine to perform any one or more of the functions of Examples 1 through 26.

The above detailed description includes references to the accompanying drawings, which form a part of the detailed description. The drawings show, by way of illustration, specific aspects of the present disclosure in which the invention can be practiced. These aspects are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects of the present disclosure can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The invention claimed is:

1. A mobile device configured to transmit a signal at a transmit frequency, the mobile device comprising:
a chassis having a slit along one dimension of the chassis,
wherein a first aperture of the slit faces a first direction internal to the mobile device, the first aperture having a dimension that comprises a first subwavelength of the transmit frequency; and
a second aperture of the slit that faces a direction opposite to the first direction, the second aperture having a dimension that comprises a second subwavelength of the transmit frequency,
wherein the dimension of the first aperture and the dimension of the second aperture are smaller than a wavelength of the transmit frequency;
wherein the slit comprises a channel that connects the first aperture and the second aperture, to support a transverse electromagnetic mode for propagation of the signal from the first aperture through the channel to the second aperture and a depth of the channel is smaller than the wavelength of the transmit frequency,
wherein an antenna array within the chassis comprises a primary radiator within the mobile device to irradiate the first aperture, and a distance from the primary radiator to the first aperture is smaller than the dimension of the first aperture and the dimension of the second aperture, and
wherein the chassis is configured as a secondary radiator and a cross-sectional profile of the channel is configured to provide a resonant transmission line.

2. The mobile device of claim 1, wherein the first subwavelength of the transmit frequency is substantially equal to the second subwavelength of the transmit frequency.

3. The mobile device of claim 1, wherein the first aperture, the second aperture, a cross section of the channel, and channel thickness comprise a transmission line that supports the transverse electromagnetic mode.

4. The mobile device of claim 1, wherein the slit comprises a length dimension, and the antenna array is centered along the length dimension of the slit.

5. The mobile device of claim 1, wherein the transmit frequency is in a millimeter wave band in a 5G wireless communication network.

6. The mobile device of claim 1, wherein the cross-sectional profile of the channel is configured with a plurality of chamfering patterns.

7. The mobile device of claim 6, wherein the plurality of chamfering patterns include linear chamfering.

8. The mobile device of claim 6, wherein the plurality of chamfering patterns include curvilinear chamfering.

9. The mobile device of claim 1, wherein the cross-sectional profile of the channel is configured to provide the resonant transmission line mode at 60 GHz when the signal is transmitted through the slit.

10. A chassis for a mobile device comprising:
a cover having a slit along one dimension of the cover wherein the cover is configured to receive a transceiver coupled to an antenna array that is configured to transmit a signal at a transmit frequency;
a first aperture of the slit configured to face a first direction internal to the mobile device, the first aperture having a dimension that comprises a first subwavelength of the transmit frequency; and
a second aperture of the slit configured to face a direction opposite to the first direction, the second aperture having a dimension that comprises a second subwavelength of the transmit frequency,
wherein the dimension of the first aperture and the dimension of the second aperture are smaller than a wavelength of the transmit frequency,
wherein the slit comprises a channel that connects the first aperture and the second aperture and a depth of the channel is smaller than the wavelength of the transmit frequency,
wherein the antenna array within the chassis comprises a primary radiator within the mobile device to irradiate the first aperture, and a distance from the primary radiator to the first aperture is smaller than the dimension of the first aperture and the dimension of the second aperture, and
wherein the channel is configured to support a transverse electromagnetic mode for propagation of the signal from the first aperture through the channel to the second aperture when the first aperture is irradiated by the antenna array.

11. The chassis of claim 10, wherein the cover is configured to function as a radiator.

12. The chassis of claim 10, wherein the first aperture dimension and the second aperture dimension are each configured to be about a quarter wavelength of the frequency.

13. The chassis of claim 10, wherein the antenna array comprises a plurality of antenna elements each comprising patches, or a plurality of antenna elements each comprising an inner conductor and an outer conductor and having a dielectric between the inner conductor and the outer conductor.

14. The chassis of claim 10, wherein the first aperture, the second aperture, a cross section of the channel, and channel thickness comprises a transmission line that supports the transverse electromagnetic mode.

15. The chassis of claim 10, wherein the slit has a length dimension, and the antenna array is centered along the length dimension of the slit at a distance from the chassis of a subwavelength of the transmit frequency.

16. The chassis of claim 10, wherein the transmit frequency is in a millimeter wave band in a 5G network.

17. A method of operating a mobile device comprising:
sending a signal to at least one Evolved Node B (eNB) from a transceiver via an antenna array that is configured to transmit the signal at a transmit frequency,
wherein the transceiver and the antenna array are within a chassis,
wherein the chassis has a slit along one dimension of the chassis,
wherein a first aperture of the slit is configured to face a first direction internal to the mobile device, the first aperture having a dimension that comprises a first subwavelength of the transmit frequency,
wherein a second aperture of the slit is configured to face a direction opposite to the first direction, the second aperture having a dimension that comprises a second subwavelength of the transmit frequency,
wherein the slit comprises a channel that connects the first aperture and the second aperture and a depth of the channel is smaller than the wavelength of the transmit frequency, wherein the channel is configured to support a transverse electromagnetic mode for propagation of the signal from the first aperture through the channel to the second aperture, wherein the antenna array within the chassis comprises a primary radiator within the mobile device to irradiate the first aperture, and a distance from the primary radiator to the first aperture is smaller than the dimension of the first aperture and the dimension of the second aperture, and wherein the chassis functions as a secondary radiator and a cross-sectional profile of the channel is configured to provide a resonant transmission line; and receiving a return signal from at least one eNB via the antenna array.

18. The method of claim 17, wherein the mobile device is configured to operate with a 3GPP LTE cellular network.

19. The method of claim 17, wherein the mobile device is a communication station (STA) configured to operate in a Wi-Fi network.

20. The method of claim 17, wherein the transmit frequency is in a millimeter wave band, and the mobile device and the at least one eNB are in a 5G network.

21. A mobile device comprising:
a transceiver coupled to an antenna array that is configured to operate as a primary radiator and transmit a signal at a first transmit frequency, the transceiver and antenna array situated within a chassis that has a slit along one dimension;
a first side of the chassis configured to face a first direction internal to the mobile device and including a first dimension of the slit that comprises a first aperture, the first dimension being a first subwavelength of the transmit frequency;
a second side of the chassis configured to face free space and having a second dimension of the slit that comprises a second aperture, the second dimension being a second subwavelength of the transmit frequency, wherein the dimension of the first aperture and the dimension of the second aperture are smaller than a wavelength of the transmit frequency; and
a channel in the chassis that connects the first aperture and the second aperture, wherein he antenna array is configured to face the first side of the chassis to transmit the signal to the first aperture and a depth of the channel is smaller than the wavelength of the transmit frequency,
a cross-sectional profile of the channel is configured to provide a resonant transmission line, and
the chassis, when irradiated by the primary radiator, functions as a secondary radiator, wherein a distance from the primary radiator to the first aperture is smaller than the first dimension and the second dimension wavelength of the transmit frequency.

22. The mobile device of claim 21, wherein the first aperture, the second aperture, a cross section of the channel, and channel thickness comprises a transmission line that supports the transverse electromagnetic mode.

23. The mobile device of claim 21, wherein the slit has a length dimension, and the antenna array is centered along the length dimension of the slit at a distance of a subwavelength of the transmit frequency from the chassis.

24. The mobile device of claim 21, wherein the antenna array comprises a plurality of antenna elements each comprising patches, or a plurality of antenna elements each comprising an inner conductor and an outer conductor and having a dielectric between the inner conductor and the outer conductor.

* * * * *

UNITED STATES PATENT AND TRADEMARK OFFICE
CERTIFICATE OF CORRECTION

PATENT NO. : 10,686,482 B2  
APPLICATION NO. : 15/386753  
DATED : June 16, 2020  
INVENTOR(S) : Michaeli et al.

Page 1 of 1

It is certified that error appears in the above-identified patent and that said Letters Patent is hereby corrected as shown below:

In the Claims

In Column 18, Line 9, in Claim 21, delete "he" and insert --the-- therefor

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*